(12) United States Patent
Oda et al.

(10) Patent No.: US 7,629,057 B2
(45) Date of Patent: Dec. 8, 2009

(54) IRON SPECIES PREFORM

(75) Inventors: Teruyuki Oda, Tokyo (JP); Hiroshi Takiguchi, Tochigi (JP)

(73) Assignees: Fuji Jukogyo Kabushiki Kaisha, Tokyo (JP); Nippon Piston Ring Co., Ltd, Saitama (JP)

( * ) Notice: Subject to any disclaimer, the term of this patent is extended or adjusted under 35 U.S.C. 154(b) by 282 days.

(21) Appl. No.: 11/529,075

(22) Filed: Sep. 28, 2006

(65) Prior Publication Data
US 2007/0077448 A1 Apr. 5, 2007

(30) Foreign Application Priority Data
Sep. 30, 2005 (JP) .................... P. 2005-287941

(51) Int. Cl.
*B32B 3/10* (2006.01)
*B32B 3/26* (2006.01)
*B32B 3/30* (2006.01)
*B32B 15/01* (2006.01)
*B32B 15/20* (2006.01)

(52) U.S. Cl. ............... 428/597; 428/587; 428/594; 428/603; 428/650; 384/129

(58) Field of Classification Search .......... None
See application file for complete search history.

(56) References Cited

U.S. PATENT DOCUMENTS

| | | | |
|---|---|---|---|
| 5,501,529 A * | 3/1996 | Cadle et al. .......... 384/432 |
| 6,422,755 B1 * | 7/2002 | Cadle et al. .......... 384/433 |
| 6,647,945 B2 * | 11/2003 | Harima ............ 123/195 R |
| 6,942,391 B2 * | 9/2005 | Nakamura ............. 384/432 |
| 7,014,677 B2 * | 3/2006 | Takiguchi et al. .......... 75/243 |
| 2002/0170161 A1 * | 11/2002 | Cadle et al. ............. 29/505 |
| 2003/0180172 A1 * | 9/2003 | Oda ....................... 419/5 |
| 2004/0182200 A1 * | 9/2004 | Takiguchi et al. .......... 75/246 |
| 2006/0073065 A1 * | 4/2006 | Takiguchi et al. ........... 419/32 |

FOREIGN PATENT DOCUMENTS

| | | |
|---|---|---|
| DE | 196 40 719 | 10/1997 |
| DE | 19640719 | 10/1999 |
| EP | 1 321 207 | 6/2003 |
| EP | 1321207 | 6/2003 |
| JP | 2004 204703 | 7/2004 |
| JP | A-2004-204298 | 7/2004 |

* cited by examiner

*Primary Examiner*—Jennifer McNeil
*Assistant Examiner*—Jason L Savage
(74) *Attorney, Agent, or Firm*—Smith, Gambrell & Russell

(57) ABSTRACT

A preform main body of an iron species preform for forming a metal matrix composite inserted in an aluminum species alloy base material to be cast-in is bored with a first to fourth through holes communicating an inner peripheral face and an outer peripheral face. In a cast-in step, shrinkage in a peripheral direction of the inner peripheral face and the outer peripheral face of the iron species preform in accordance with solidification of the melted aluminum species alloy is uniformly received by shrinkage in accordance with solidification of the melted aluminum species alloy invading the through holes, movement thereof in the peripheral direction is restrained, a clearance can be prevented from being brought about at an interface, a cast-in performance is excellent and a stable bonding strength of the interface is achieved.

14 Claims, 12 Drawing Sheets

US 7,629,057 B2

IRON SPECIES PREFORM

This application claims foreign priority from Japanese Patent Application No. 2005-287941, filed on Sep. 30, 2005, the entire contents of which are hereby incorporated by reference.

BACKGROUND OF THE INVENTION

1. Field of the Invention

The present invention relates to an iron species preform for forming a metal matrix composite excellent in cast-in performance by an aluminum species alloy used for forming a Metal Matrix Composite (MMC).

2. Related Art

In a background art, for example, in a vehicular engine, there is widely used a cylinder block constituted by casting an aluminum species alloy for achieving a reduction in weight. In such an engine, when a journal portion is formed at the cylinder block made of the aluminum species alloy (thermal expansion coefficient: about $21.0 \times 10^{-6}/°C.$) and a crankshaft made of iron species material (thermal expansion coefficient: about $9 \times 10^{-6}$ through $12 \times 10^{-6}/°C.$) is axially supported by the journal portion by interposing a bearing metal, heat generated by combustion of a mixture gas at inside of a cylinder in operating the engine is transmitted to the journal portion. When a temperature of the journal portion rises, by a difference between the thermal expansion coefficients of the iron species material and a base metal made of the aluminum species alloy, a clearance between a bearing face of the journal portion and the crankshaft interposing a bearing metal becomes excessively large to bring about vibration or noise in running a vehicle.

Hence, for example, in a journal portion for axially supporting a crankshaft of a horizontal opposed 4 cylinder engine, at the journal portion having a bearing face constituted by recessing respective center portions of left and right cylinder blocks made of an aluminum species alloy in a shape of a semicircular arc, by constituting MMC by an iron species preform by casting-in the iron species preform made of an iron species powder sintered member in the cylinder block, a thermal expansion coefficient necessary for the journal portion is achieved without changing the aluminum species alloy of the cylinder block constituting the base material.

However, when a portion or a total of a cast product of an aluminum species alloy is constituted by MMC, it is extremely difficult to ensure a bonding strength of an interface by using generally a casting method, particularly, a High Pressure Die Casting (HPDC) and stably ensure adherence by easily melting the aluminum species alloy to invade a preform comprising an iron species powder sintered member. Further, it is known that when the preform structured by the iron species powder sintered member is inserted in an aluminum species alloy so as to be cast-in, a state of the melted aluminum species alloy invading the preform after cast-in step effects a significant influence on a mechanical property or a physical property, and a casting condition is frequently restricted in order to reduce such an influence.

Further, JP-A-2004-204298 discloses that wettability of the preform made of the iron species powder sintered member and the melted aluminum species alloy and the cast-in performance of the aluminum species alloy are improved, by constituting a structure of the preform made of an iron species powder sintered member to a structure in which a free Cu phase is dispersed in a matrix and by subjecting a shot blasting processing or a steaming processing to constitute a surface roughness of the preform by a specific roughness range, so that a bonding strength between the cylinder block main body made of the aluminum species alloy and the iron species preform is improved.

According to JP-A-2004-204298, the strength of the preform structured by the iron species powder sintered member can be increased by melting Cu to constitute a solid solution and the bonding strength of the interface can be increased by reacting with the aluminum species alloy when the preform is cast-in with the aluminum species alloy by being precipitated into the matrix as the free Cu phase.

However, when the preform is cast-in with the aluminum species alloy, there is a concern that before the interface between the preform and the base material reaches a constant bonding strength when a stress generated in solidifying and shrinking the melted aluminum species alloy to which the preform is inserted, the adherence of the interface becomes unstable and a clearance is generated at the interface to make the bonding strength unstable, owing to a shape, a specification or the like of the preform. A phenomenon of instability of the bonding strength at the interface and production of the clearance or the like is significant when accompanied by rapid cooling and solidification as in HPDC.

When there is present a clearance at the interface of the base material comprising the aluminum species alloy and the preform in the journal portion, a heat conduction efficiency between the base material and the preform is reduced to bring about a dispersion in the thermal conductivity in a peripheral direction of the journal portion. The journal portion is not uniformly expanded by the dispersion, support of the bearing metal by the bearing face of the journal portion becomes unstable and a friction coefficient between the crankshaft and the bearing metal is increased. Owing to the increase in the friction coefficient, that is, an increase in a friction resistance, wear of the bearing metal is significantly increased to constitute a factor of deteriorating fuel cost, performance, durability or the like of the engine.

Further, when there is the clearance at the interface between preform and the base material at the journal portion, in machining the bearing face of the journal portion, the portion formed by the thin wall is elastically deformed by a load in machining to deteriorate machining accuracy of the journal portion.

Further, when the clearance is present at the interface, stress concentration by high load is brought about by a residual stress or a difference of thermal expansion generated in solidifying and shrinking the melted aluminum species alloy into which the preform structured by the iron species powder sintered member is cast-in. In addition, there is a case in which the aluminum species alloy portion, that is, the base material into which the preform is cast-in is destructed.

SUMMARY OF THE INVENTION

It is a first object of the invention to provide an iron species preform for a metal matrix composite which is excellent in cast-in performance by an aluminum species alloy and capable of ensuring stable bonding strength of an interface and close contact. Further, it is a second object to provide a structure of a journal portion having the iron species preform.

In accordance with one or more embodiments of the present invention, in a first aspect, an iron species preform for forming a metal matrix composite is provided with a preform main body cast-in with an aluminum species alloy base material including a recess face having a section in a semicircular arc shape and continuously extending along a direction of a center axis. The preform main body has a section in a semicircular arc shape or a U-shape along the recess face. The preform main body is provided with an inner peripheral face and an outer peripheral face continuously extending along the direction of extending the center axis. The preform main body is bored with a through hole penetrating from the inner peripheral face to the outer peripheral face.

Further, according to a second aspect of the invention, an inner diameter of the through hole "A" may be set in a range: $1\text{ mm} \leq A \leq 19\text{ mm}$, in the iron species preform of the first aspect.

Further, in a third aspect of the invention, when an inner diameter of the through hole is "A", a depth of the through hole "C" is set in a range: $0.5\text{ A} \leq C \leq 5\text{ A}$, in the iron species preform of the first or second aspect.

Further, according to a fourth aspect of the invention, a portion in which an inner end of the through hole opened to the inner peripheral face and the inner peripheral face are continuous may be constituted by a smoothly continuous curved face or a chamfering, in the iron species preform of any one of the first to third aspects.

Further, according to a fifth aspect of the invention, an inner face of the through hole may be subjected to a surface area increasing treatment, in the iron species preform of any one of the first to fourth aspects.

Further, according to a sixth aspect, a plurality of the through holes may be bored, and when the inner diameter of the through hole is "A", a clearance between centers of openings of the adjacent through holes at the inner peripheral face "B" may be set in a range: $1.5\text{ A} \leq B \leq 5\text{ A}$, in the iron species preform of any one of the first to fifth aspects.

Further, according to a seventh aspect of the invention, the inner peripheral face and/or the outer peripheral face of the preform main body may be bored with a bottomed hole opened thereto, in the iron species preform of any one of the first to sixth aspects.

In addition, in accordance with one or more embodiments of the present invention, in a eighth aspect, an iron species preform for forming a metal matrix composite is provided with a preform main body which is cast-in with an aluminum species alloy base material including a recess face having a section in a semicircular arc shape and continuously extending along a direction of a center axis. The preform main body has a section in a semicircular arc shape or a U-shape along the recess face. The preform main body is provided with an inner peripheral face and an outer peripheral face continuously extending along the direction of the center axis. In addition, the preform main body is bored with a bottomed hole opened to the inner peripheral face and/or the outer peripheral face.

Further, according to a ninth aspect of the invention, an inner diameter of the bottomed hole "a" may be set in a range: $1\text{ mm} \leq a \leq 19\text{ mm}$, in the iron species preform of the seventh or eighth aspect.

Further, according to a tenth aspect of the invention, when the inner diameter of the bottomed hole is designated by the notation "a", a depth of the bottomed hole "c" may be set in a range: $0.5a \leq c \leq 5a$, in the iron species preform of any one of the seventh to ninth aspects.

Further, according to an eleventh aspect of the invention, the iron species preform may be structured by an iron species powder sintered member, in the iron species preform of any one of the first to tenth aspects.

In addition, in accordance with one or more embodiments of the present invention, in a twelfth aspect of the invention, a structure of a journal portion is constituted by casting-in the iron species preform of any one of the first to eleventh aspects with an aluminum species alloy base material having a bearing face in a recess face shape having a section along an inner peripheral face of the preform main body by a semicircular arc shape and formed continuously extending along a direction of the center axis.

According to the iron species preform of the first aspect, by boring the through hole communicating the inner peripheral face and the outer peripheral face in the preform main body, in the cast-in step, the melted aluminum alloy injected to a side of the outer peripheral face of the iron species preform invades a side of the inner peripheral face along a surface of the iron species preform and is supplied to the side of the inner peripheral face by way of the through hole from the side of the inner peripheral face to achieve excellent performance of passage of molten metal. Further, when a shrinking stress is operated along the inner peripheral face in solidifying and shrinking the melted aluminum species alloy injected to between the recess face in the semicircular arc shape and the inner peripheral face of the iron species preform and a shrinking stress is operated along the outer peripheral face by solidifying and shrinking the melted aluminum species alloy injected to a side of the outer peripheral face, the shrinking stresses along the inner peripheral face and the outer peripheral face are dispersed and received by a resisting force by a shrinking stress by solidifying and shrinking the melted aluminum species alloy invading the throughhole, movement of the melted aluminum species alloy is restrained and the melted aluminum species alloy is brought into close contact with the inner peripheral face and the outer peripheral face and a residual stress produced at the base material after shrinking is alleviated.

Further, by restraining movement of the melted aluminum alloy in solidifying and shrinking the melted aluminum alloy, a clearance can be prevented from being brought about at an interface of the base material and the iron species preform and a stable bonding stress and close contact of an interface can be ensured.

According to the iron species preform of the second aspect, by making an inner diameter of the through hole equal to or larger than 1 mm and equal to or smaller than 19 mm, a constraining force opposed to the shrinking stresses along the inner peripheral face and the outer peripheral face in accordance with solidification and shrinkage of the melted aluminum species alloy is pertinently ensured and the bonding stress of the interface becomes stable. When the inner diameter of the through hole is assumedly made to be smaller than 1 mm, the constraining force opposed to the stresses along the inner peripheral face and the outer peripheral face in accordance with solidification and shrinkage of the melted aluminum species alloy becomes excessively small, an effect of promoting the adherence of the interface becomes extremely small. Further, when subjected to the shot blasting processing, it is difficult to excellently blow shots to the inner face of the through hole and the effect of the shot blasting processing cannot be expected. On the other hand, when the inner diameter A of the through hole is made to be larger than 19 mm, the volume of the iron species preform is reduced and there is a concern of reducing a function and an effect inherent to the preform, an influence of shrinkage in accordance with solidifying the melted aluminum species alloy is increased in the through hole, the adherence with the base material at the through hole becomes excessively small, and the bonding strength of the interface becomes unstable.

According to the iron species preform of the third aspect, by making the depth of the through hole equal to or larger than 0.5 times as much as the inner diameter and equal to or smaller than 5 times as much as the inner diameter, during the cast-in step, invasion of the melted aluminum species alloy into the through hole is facilitated in the internal chill and the through hole is facilitated to form.

According to the iron species preform of the fourth aspect, by constituting the portion in which the inner end of the through hole opened to the inner peripheral face and the inner face peripheral face are continuous by a smoothly continuous curved face or a chamfering, the interface bonding strength and close contact can be ensured, stress concentration in solidifying and shrinking the melted aluminum species alloy is restrained and the base material can be prevented from being broken or cracked.

According to the iron species preform of the fifth aspect, the resisting force by the shrinking stress by solidifying and shrinking the melted aluminum species alloy invading the through hole is increased by subjecting the inner face of the through hole to the surface area enlarging treatment, that is, by increasing the area of the inner face of the through hole by, for example, a groove in a spiral shape, a rib, or a slit.

According to the iron species preform of the sixth aspect, by making the clearance between the centers of the openings of the adjacent through holes equal to or larger than 1.5 times as much as the through hole and equal to or lower than 5 times as much as the through hole, the through hole is facilitated to be formed and the clearance is prevented from being brought about at the interface and the bonding strength of the interface can be ensured.

According to the iron species preform of the seventh aspect, by boring the bottomed hole opened to the inner peripheral face and/or the outer peripheral face of the preform main body, by the resisting force by the shrinking stress by solidifying and shrinking the melted aluminum species alloy invading the bottomed hole, the shrinking stress operated along the inner peripheral face or the outer peripheral face is dispersed and received, movement of the melted aluminum species alloy is restrained and the melted aluminum species alloy is brought into close contact with the inner peripheral face and the outer peripheral face, and a residual stress produced at the base material after shrinking is alleviated. A restriction of boring is smaller in the bottomed hole than in the through hole and the bottomed hole can be bored even at a portion at which boring or the through hole is restricted.

According to the iron species preform of the eighth aspect, by the resisting force by the shrinking stress by solidifying and shrinking the melted aluminum species alloy invading the bottomed hole opened to the inner peripheral face and/or the outer peripheral face of the preform main body, the shrinking stress operated along the inner peripheral face and the outer peripheral face by solidifying and shrinking the melted aluminum species alloy is dispersed and received, movement of the melted aluminum species alloy along the inner peripheral face and the outer peripheral face is restrained and the melted aluminum species alloy is brought into close contact with the inner peripheral face and the outer peripheral face and the residual stress produced at the base material after solidification and shrinkage is alleviated. Further, in accordance with restraining movement of the melted aluminum alloy in solidifying and shrinking the melted aluminum alloy, the clearance is prevented from being brought about at the interface of the base material and the iron species preform, the cast-in performance is excellent and a stable bonding strength of the interface and close contact can be ensured.

According to the iron species preform on the ninth aspect, by making the inner diameter of the bottomed hole equal to or larger than 1 mm and equal to or smaller than 19 mm, the constraining force opposed to the stress along the inner peripheral face and/or the outer peripheral face in accordance with solidifying and shrinking the melted aluminum species alloy is pertinently ensured and the interface strength of the base material is made to be stable. When the inner diameter of the bottomed hole is assumedly made to be smaller than 1 mm, the constraining force opposed to the stress along the inner peripheral face and/or the outer peripheral face in accordance with solidification and shrinkage of the melted aluminum species alloy becomes excessively small, and the effect of promoting the adherence of the interface becomes extremely small. Further, when subjected to the shot blasting processing, it is difficult to excellently blow shots to the inner face of the bottomed hole and the effect of the shot blasting processing cannot be expected. On the other hand, when the inner diameter A of the bottomed hole is made to be larger than 19 mm, the volume of the iron species preform is reduced and there is a concern of reducing function and effect inherent to the preform, the effect of shrinking in accordance with solidification of the melted aluminum species alloy becomes significant in the bottomed hole, the adherence with the base material is reduced in the bottomed hole, constraining force becomes excessively small and the interface strength becomes unstable.

According to the iron species preform of the tenth aspect, by making the depth of the bottomed hole equal to or larger than 0.5 times as much as the inner diameter and equal to or smaller than 5 times as much as the inner diameter, in the casting-in step, invasion of the melted aluminum species alloy into the bottomed hole is facilitated and forming of the bottomed hole is facilitated.

According the iron species preform of the eleventh aspect, the iron species preform structured by the iron species powder sintered member includes pores, by casting-in the iron species preform with the melted aluminum species alloy, the melted aluminum species alloy is easily and stably brought into close contact with the iron species preform, depending on cases, the melted aluminum species alloy is melted to invade the iron species preform and the iron species preform can pertinently constitute MMC.

According to the structure of the twelfth aspect, in the journal portion formed by inserting the iron species preform so as to be cast-in with the base member made of the aluminum species alloy having the bearing face in the recess face shape continuously formed by the section in the semicircular arc shape along the inner peripheral face of the iron species preform, the difference between the thermal expansion coefficients of the iron species preform and the shaft of the iron species material is reduced, even when the temperature of the journal portion rises, the clearance between the shaft and the bearing face can be confined to an allowable range, and vibration or noise in rotating the shaft can be prevented from being brought about.

Further, the clearance of the interface is prevented from being brought about at the inner peripheral face of the iron species preform, the thermal conduction efficiency of the base material and the iron species preform is promoted and a thermal conductivity becomes uniform in the peripheral direction of the journal portion, the side of the bearing face of the journal portion is uniformly expanded and circularity is ensured. Thereby, the increase in the friction coefficient between the journal and the shaft is restrained from being increased and in accordance with the reduction in the friction resistance, fuel cost, function, durability or the like of the engine can be ensured.

Other aspects and advantages of the invention will be apparent from the following description and the appended claims.

DETAILED DESCRIPTION OF THE EXEMPLARY EMBODIMENTS

An explanation will be given of exemplary embodiments of an iron species preform for forming a metal matrix composite and a structure of a journal portion having an iron species preform according to the invention by taking an example of a journal portion of a crankshaft of a horizontal opposed 4 cylinder engine and an iron species prefrom arranged at the journal portion in reference to the drawings as follows.

First Exemplary Embodiment

Figure 1:
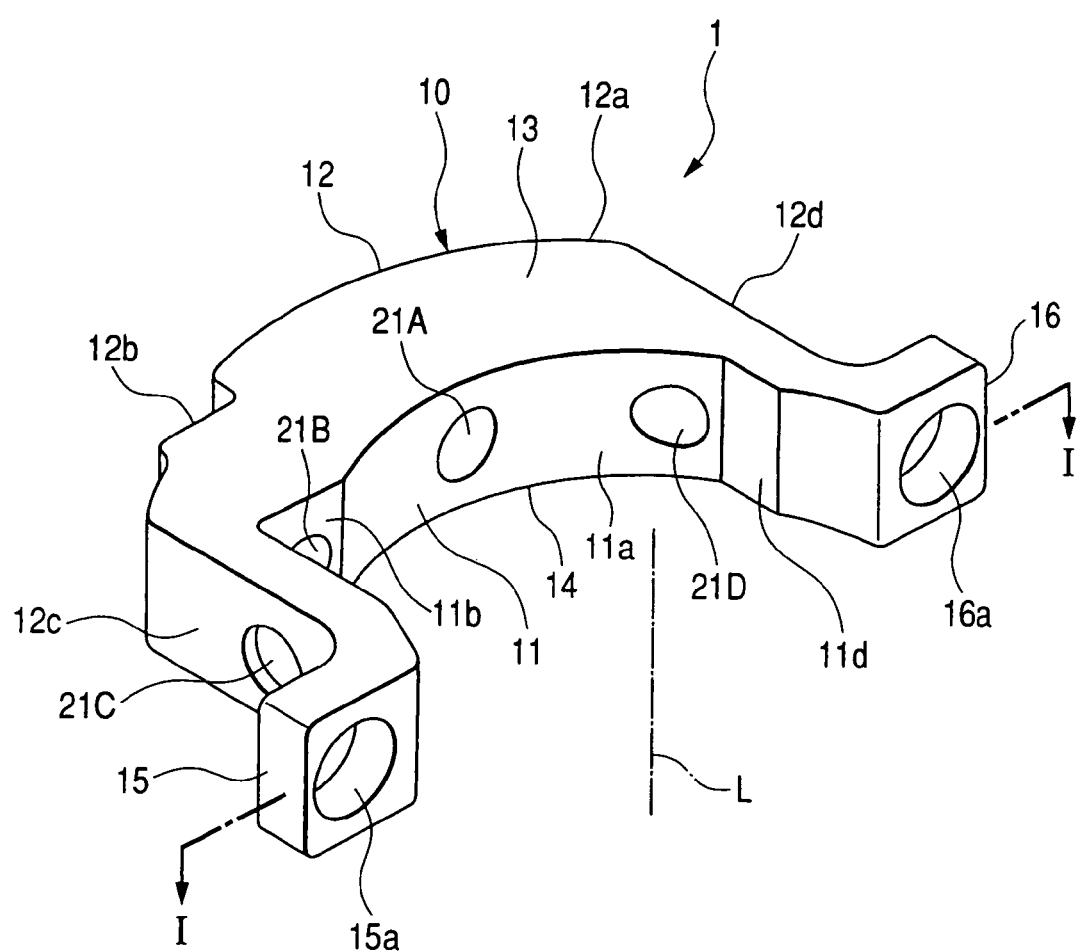
FIG. 1 is a perspective view showing an outline of an iron species preform according to a first exemplary embodiment.
Figure 2:
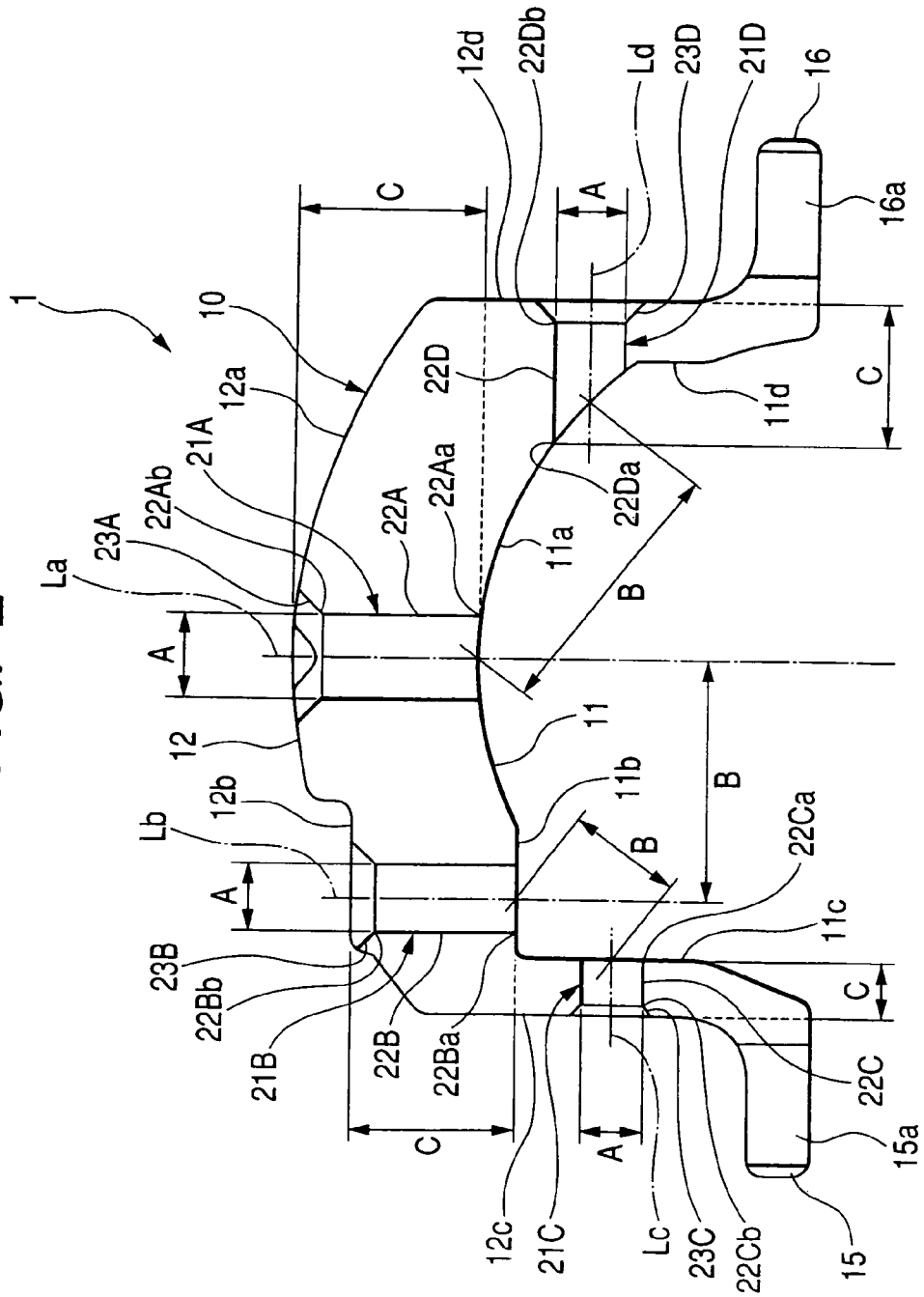
FIG. 2 is a sectional view taken along a line I-I of FIG. 1.

FIG. 1 is a perspective view showing an outline of an iron species preform according to a first exemplary embodiment, and FIG. 2 is a sectional view taken along a line I-I of FIG. 1.

An iron species preform for forming a metal matrix composite (hereinafter, referred to as "iron species preform") 1 according to the exemplary embodiment is formed by an iron species powder sintered member constituted by mixing an iron species powder, a copper powder, a graphite powder, a lubricant powder or further mixing a fine power for improving machinability to constitute a mixed powder, thereafter charging the mixed powder into a die to form under pressure by using a press or the like to be sintered at 1100 through 1250° C. Further, as a sintering condition, it is preferable to adjust temperature and time such that a thermal expansion coefficient of the iron species powder sintered member becomes equal to or smaller than $13.5 \times 10^{-6}$° C.

As shown by FIG. 1 and FIG. 2, the iron species preform 1 includes a preform main body 10 having an inner peripheral face 11 and an outer peripheral face 12 in a semicircular arc shape or a U-shape extended along a direction of a center axis L, and end faces 13, 14 opposed to each other, both end edges of the preform main body 10 are integrally formed with flange portions 15, 16, and the respective flange portions 15, 16 are bored with through holes 15a, 16a.

The inner peripheral face 11 of the preform main body 10 includes a first inner peripheral face 11a substantially in a semicircular arc shape and extended along a direction of the center axis L, a second inner peripheral face 11b in a flat face shape formed continuously to one end of the inner peripheral face 11a, and a third inner peripheral face 11c and a fourth inner peripheral face 11d in a flat face shape respectively continuous to other ends of the second inner peripheral face 11b and the first inner peripheral face 11a and opposed to each other. The outer peripheral face 12 includes a first outer peripheral face 12a substantially in a semicircular arc shape and extended along the direction of the center axis L, a second outer peripheral face 12b in a flat face shape formed continuously to one end of the first outer peripheral face 12a, and a third outer peripheral face 12c and a fourth outer peripheral face 12d respectively continuous to other ends of the second outer peripheral face 12b and the first outer peripheral face 12a and opposed to each other.

A plurality of the through holes communicating the outer peripheral face 12 and the inner peripheral face 11 of the preform main body 10 are bored. According to the exemplary embodiment, there are bored respective through holes of a first through hole 21A having a reference lien La orthogonal to the center axis L and communicating the first inner peripheral face 11a and the outer peripheral face 12a, a second through hole 21B having a reference line Lb in parallel with the reference line La and communicating the second inner peripheral face 11b and the second outer peripheral face 12b, a third through hole 21C having a reference line Lc orthogonal to the reference line La and communicating the third inner peripheral face 11c and the third outer peripheral face 12c, and a fourth through hole 21D having a reference line Ld orthogonal to the reference line La and communicating the first inner peripheral face 11a at a vicinity of the fourth inner peripheral face 11d and the fourth outer peripheral face 12d.

By forming the first to fourth through holes 21A to 21D, molten metal passage is improved when the inner peripheral face 11 and the outer peripheral face 12 of the iron species preform 1 are communicated to insert the iron species preform 1 in an aluminum species alloy, a surface area of the iron species preform 1 is increased to achieve adherence and a bonding strength with the melted aluminum species alloy, the melted aluminum species alloy is easily and stably brought into close contact therewith to achieve MMC formation thereof. Depending on cases, the melted aluminum species alloy may be melted to invade the iron species preform 1. The first to fourth through holes 21A to 21D are formed in forming under pressure by a die or machining a sintered member. Preferably, by simultaneously forming the through holes in forming under pressure by the die, efficient formation of fabrication is achieved and fabrication cost is restrained.

The first through hole 21A includes a through hole main body 22A a section of which is circular, which is provided with an inner face in a cylindrical shape continuous in a direction of the reference line La and an inner end line 22Aa of which is opened to the inner peripheral face 11a, and a taper hole portion 23a which is formed continuously to an outer end 22Ab of the through hole main body 22A opened to the first outer peripheral face 12a and an inner diameter of which is gradually increased as proceeding from a side of the outer end 22Ab of the through hole main body 22A to a side of the first outer peripheral face 11a.

A second through hole 21B includes a through hole main body 22B a section of which is circular, which includes an inner face in a cylindrical shape continuous in a direction of the reference line Lb and an inner end 22Ba of which is opened to the second inner peripheral face 11*b*, and a taper hole portion 23B which is formed continuously to an outer end 22Bb of the through hole main body 22B and is opened to the second outer peripheral face 12*b* and an inner diameter of which is gradually increased as proceeding from a side of the outer end 22Bb of the through hole main body 22B to a side of the second outer peripheral face 12*b*.

A third through hole 21C includes a through hole main body 22C a section of which is circular, which includes an inner face in a cylindrical shape continuous in a direction of the reference line Lc and an inner end 22Ca of which is opened to the third inner peripheral face 11*c*, and a taper hole portion 23C which is formed continuously to an outer end 22Cb of the through hole main body 22C and is opened to the third outer peripheral face 12*c* and an inner diameter of which is gradually increased as proceeding from a side of the outer end 22Cb of the through hole main body 22C to a side of the third outer peripheral face 12*c*.

The fourth through hole 21D includes a through hole main body 22D a section of which is circular, which includes an inner face in a cylindrical shape continuous in a direction of the reference line Ld and an inner end 22Da of which is opened to the first inner peripheral face 11*a*, and a taper hole portion 23D which is formed continuously to an outer end 22Db of the through hole main body 22D and is opened to the fourth outer peripheral face 12*d* and an inner diameter of which is gradually increased as proceeding from a side of the outer end 22Db of the through hole main body 22D to a side of the fourth outer peripheral face 12*d*.

Although shapes of the respective through hole 21A to 21D differ by a specification of a product shape or the like constituting MMC, it is preferable that an inner diameter "A" of the respective through hole main bodies 22A to 22D is 1 to 19 mm when a thickness of the preform main body 10, that is, a dimension from the inner peripheral face 11 to the outer peripheral face 12 is 5 to 20 mm and a thickness of thin-walled portions 38, 39 (refer to FIG. 5), mentioned later, formed on a side of the inner peripheral face 11 by casting-in the preform to with an aluminum species alloy is 0.5 to 9.5 mm (1 mm≦A≦19 mm). Further, a clearance "B" between the adjacent through holes 21, that is, the clearance "B" between centers of openings of the inner end 22Ba of the through hole main body 22A of the first through hole 21A on a side of the inner peripheral face 11 and an inner end 22Ba of the through hole main body 22B of the second through hole 21B, the clearance "B" between centers of openings of the inner end 21Ba of the through hole main body 22B of the second through hole 21B and the inner end 22Ca of the through hole main body 22C of the third through hole 21C, the clearance "B" between centers of openings of the inner end 22Aa of the through hole main body 22A of the first through hole 21A and the inner end 22Da of the through hole main body 22D of the fourth through hole 21D, are formed to be equal to or larger than 1.5 times as much as the inner diameter "A" and equal to or smaller than 5 times as much as the inner diameter "A" of the through hole main bodies 22A through 22D (1.5 A≦B≦5 A).

Portions at which the inner ends 22Aa to 22Da of the respective through hole main bodies 21A to 21D opened to the inner peripheral face 11 and the inner peripheral face 11 are continuous are formed by smoothly continuous curved faces, so-to-speak R shape or a chamfering.

Further, it is preferable that depths "C" of the first through the fourth through holes 21A to 21D are equal to or larger than 0.5 times as much as the inner diameter "A" of the through hole main body 22A to 22D and equal to or smaller than 5 times as much as the inner diameter "A" (0.5 A≦C≦5 A).

It is preferable to determine the inner diameter "A" of the through hole main bodies 22A to 22D of the respective through holes 21A to 21D, the respective clearances "B" of the first to fourth through holes 21A to 21D contiguous to each other, the respective depths "C" of the first to fourth through holes 21A to 21D, and shapes of curved faces of the portions at which the inner ends 22Aa to 22Da of the respective through hole main bodies 22A to 22D and the inner peripheral face 12 by a close contact state of an interface of a product and a situation of bringing about crack or the like on a side of the base material previously by an experiment or a simulation in order to optimally set by the specification of the product shape or the like constituting MMC.

The iron species preform 1 is subjected to a shot blasting processing as necessary to constitute the surface roughness by 10 through 100 μm in Rz. By subjecting the iron species preform 1 to the shot blasting processing, a surface thereof is cleaned by removing an oxide film or the like formed at the surface, and the free Cu phase dispersed in the matrix is exposed to the surface. Thereby, the wettability with the melted aluminum species alloy is improved and the cast-in performance with the aluminum species alloy is improved.

The iron species preform 1 formed in this way is set to a die, and by inserting the iron species preform 1 in the melted aluminum species alloy so as to be cast-in, the aluminum species alloy is adhered easily and stably to the iron species preform 1 and depending on cases, melted to invade the iron species preform 1 to constitute MMC.

Figure 3:
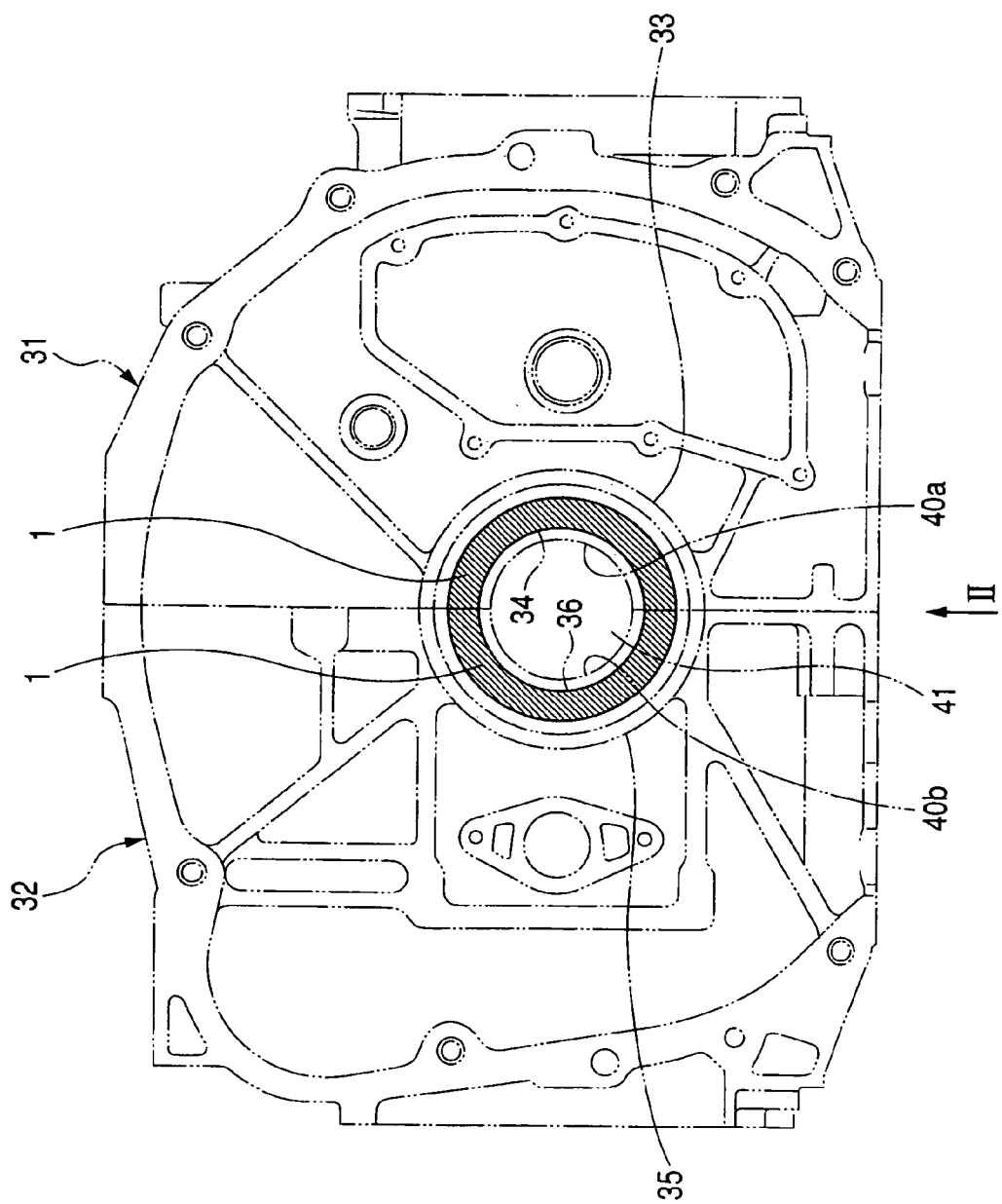
FIG. 3 is a vertical sectional view in a direction orthogonal to a crankshaft of a cylinder block.
Figure 4:
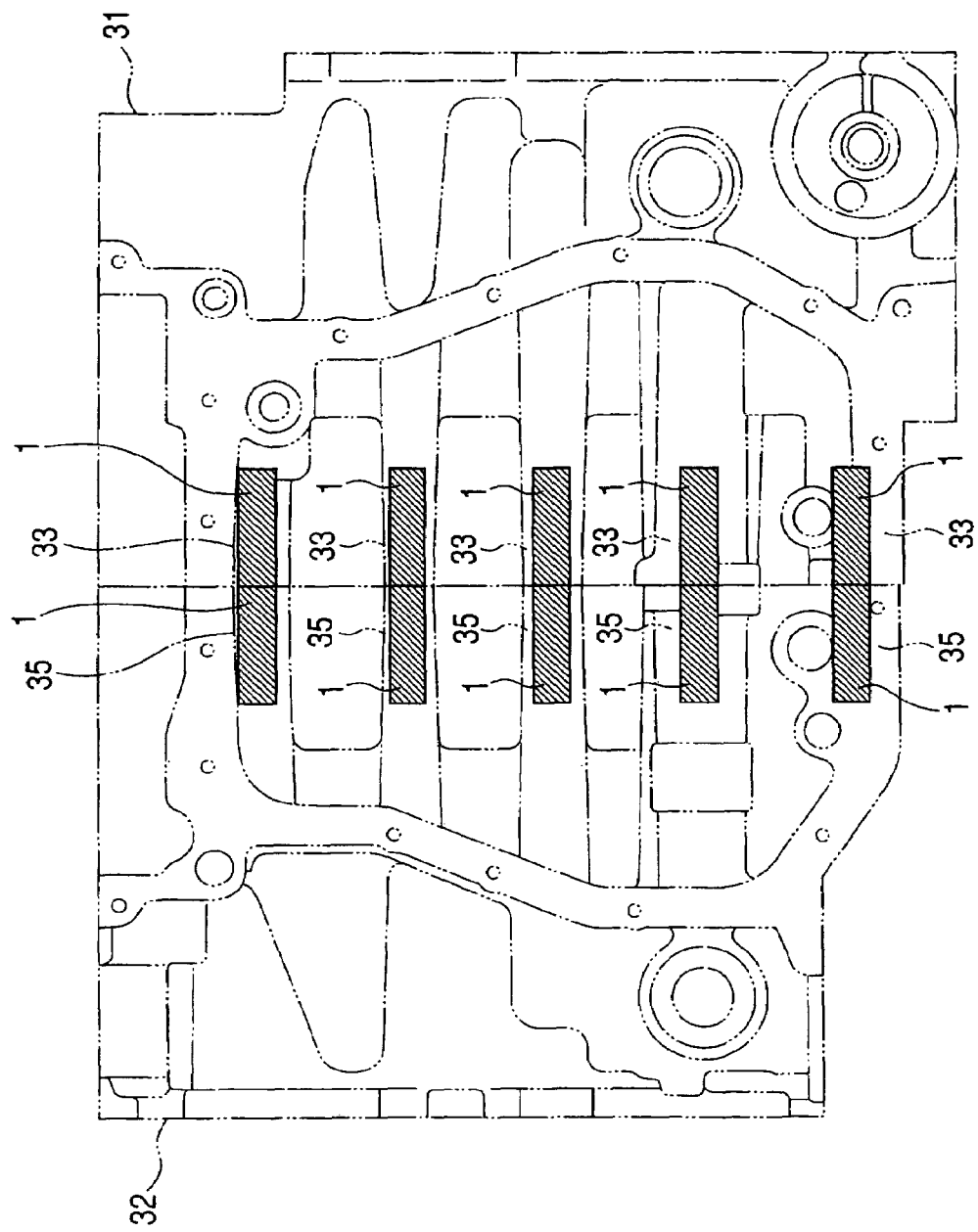
FIG. 4 is a view viewing FIG. 3 from II arrow mark direction.

FIG. 3 and FIG. 4 show an embodiment of a journal portion using the iron species preform 1. The embodiment shows a journal portion axially supporting a shaft, e.g. a crankshaft, of a horizontal opposed 4 cylinder engine, FIG. 3 is a vertical sectional view in a direction orthogonal to the crankshaft of the cylinder block, and FIG. 4 is a view viewing FIG. 3 from II arrow mark direction.

In FIG. 3 and FIG. 4, left and right cylinder blocks 31, 32 are separately formed by casting by the aluminum species alloy, the cylinder block 31 on the left side is formed with a plurality of left side journal portions 33 having bearing faces 34 constituting recessed faces formed in a shape of a semicircular arc at center portions thereof, and also the right side cylinder block 32 is formed with a plurality of right side journal portions 35 having bearing faces 36 similar thereto.

A crankshaft 41 is arranged by interposing bearing metals 40*a*, 40*b* in a halved shape to the bearing faces 34, 36 of the left and right of the respective journal portions 33, 35 to be pinched thereby, and is axially supported by interposing the bearing metals 40*a*, 40*b* to the bearing faces 34, 36 in the semicircular arc shape of the respective journal portions 33, 35. The crankshaft 41 is formed by an iron species material and is rotated by being transmitted with reciprocal movement of a piston by way of a connecting rod by combustion of a mixture gas at inside of a cylinder, always subjected to large impulsive load and is thermally expanded by transferring heat generated by combustion of the mixture gas.

According to the embodiment, the left and right respective journal portions 33, 35 are provided with the iron species performs 1 having a structure shown in FIG. 1 and FIG. 2 by constituting MMC. The respective iron species performs 1 are arranged in casting to form the respective cylinder blocks 31, 32 at positions of forming the journal portions of casting dies thereof to constitute MMC in the cast-in step.

Figure 5:
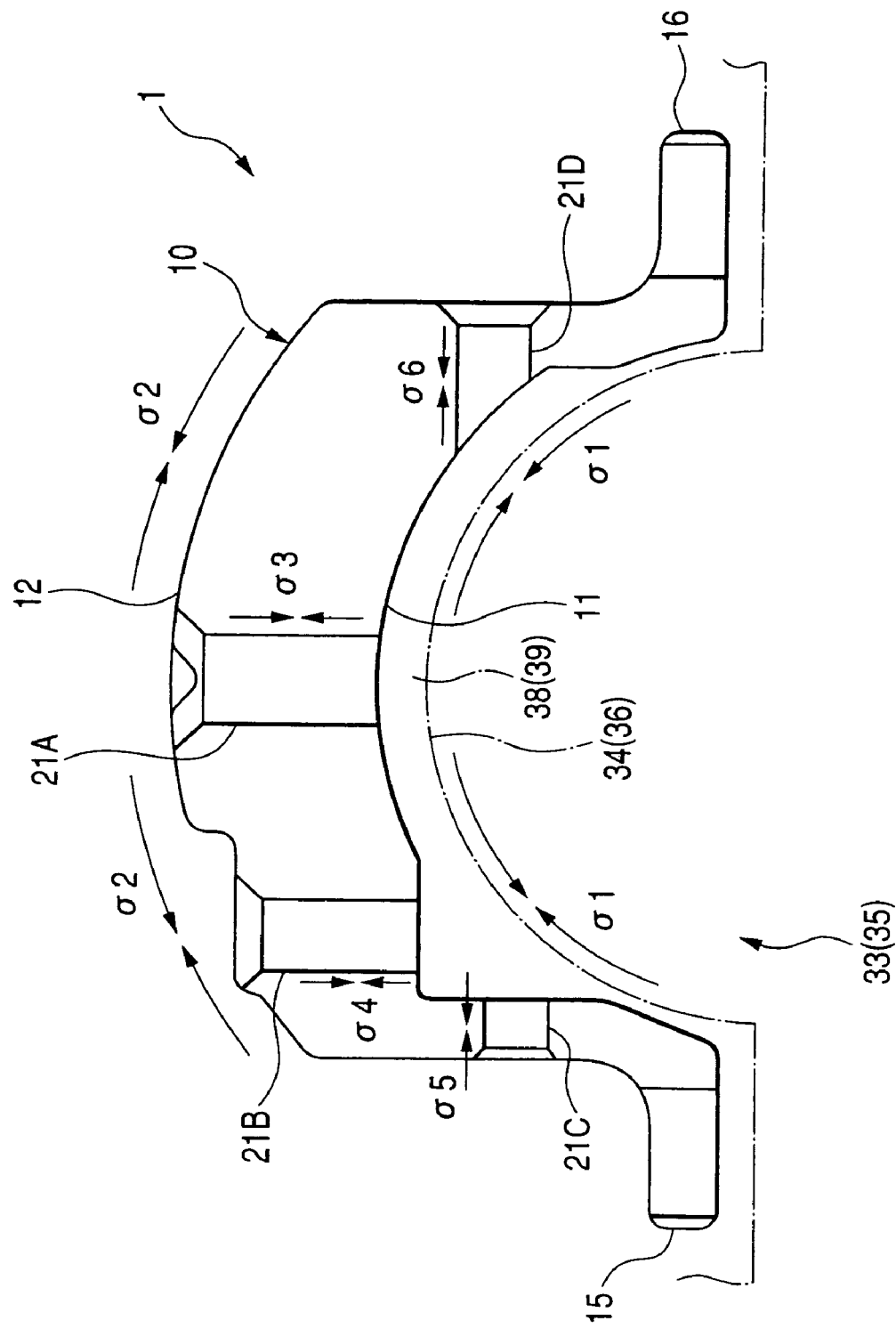
FIG. 5 is an explanatory view of a journal portion.

In the cast-in step, the melted aluminum alloy injected to a side of the peripheral face 12 of the iron species preform 1 invades the side of the inner peripheral face 11 of the iron species preform 1 along the surface of the iron species preform 1 and supplied to the side of the inner peripheral face 11 also by way of the respective through holes 21A to 21D to achieve excellent performance of passage of the melted aluminum species alloy. According thereto, even at thin-walled portions 38, 39 which are extremely as thin as about 2 to 3 mm formed between the bearing faces 34, 36 in the semicircular arc shape formed at the journal portions 33, 34 and the inner peripheral face 11 of the iron species preform 1 as shown by FIG. 5 particularly, the excellent molten metal passage performance is achieved.

A shrinking stress $\sigma 1$ is operated in the peripheral direction along the inner peripheral face 11 in solidifying and shrinking the melted aluminum species alloy injected to the thin-walled portions 38, 39 between the bearing face 34, 36 of the journal portions 33, 35 and the inner peripheral face 11 of the iron species preform 1, and a shrinking stress $\sigma 2$ is operated in the peripheral direction along the outer peripheral face 12 also by solidifying and shrinking the aluminum species alloy injected to a side of the outer peripheral face 12. On the other hand, shrinking stresses $\sigma 3$, $\sigma 4$, $\sigma 5$, $\sigma 6$ are respectively operated along the respective through holes 21A to 21D by solidifying and shrinking the melted aluminum species alloy invading the respective through holes 21A to 21D of the iron species preform 1.

By resisting forces by the shrinking stresses $\sigma 3$, $\sigma 4$, $\sigma 5$, $\sigma 6$ by solidifying and shrinking the melted aluminum species alloy invading the respective through holes 21A to 21D of the iron species preform 1, the shrinking stress $\sigma 1$ operated in the peripheral direction along the inner peripheral face 11 in solidifying and shrinking the melted aluminum species alloy injected to the thin-walled portions 38, 39 is dispersed and received. Thereby, movement of the melted aluminum species alloy along the inner peripheral face 11 is restrained and the melted aluminum species alloy is brought into close contact with the inner peripheral face 11, a residual stress produced at the thin-walled portions 38, 39 by the melted aluminum species alloy after shrinking can be alleviated and uniformly dispersed, the residual stress of the thin-walled portions 38, 39 is alleviated and the portion can be prevented from being cracked or the like.

Similarly, by the resisting forces by the shrinking stresses $\sigma 3$, $\sigma 4$, $\sigma 5$, $\sigma 6$ by solidifying and shrinking the melted aluminum species alloy invading the respective through holes 21A to 21D of the iron species preform 1, the shrinking stress $\sigma 2$ operated along the outer peripheral face 12 by solidifying and shrinking the melted aluminum species alloy injected to the side of the outer peripheral face 12 of the iron species preform 1 is dispersed and received, movement of the melted aluminum species alloy along the outer peripheral face 12 is restrained and the melted aluminum species alloy is brought into close contact with the outer peripheral face 12, and the residual stress produced at the portion after shrinking can be alleviated and uniformly dispersed.

Further, in accordance with restraining movement of the melted aluminum species alloy in the peripheral direction along the inner peripheral face 11 and the outer peripheral face 12 of the iron species preform 1 in solidifying and contacting the melted aluminum alloy and bringing the melted aluminum species alloy into close contact with the iron species preform 1, a clearance at the interface of the iron species preform 1 and the base material by the aluminum species alloy can be prevented from being brought and the interface strength between the inner peripheral face 11 and the outer peripheral face 12 of the iron species preform 1 and the base material including the thin-walled portions 38, 39 can be ensured.

Here, the iron species preform 1 is structured by the iron species powder sintered member and therefore, the iron species preform 1 includes pores. Therefore, the melted aluminum species alloy is easily and stably brought into close contact with the iron species preform 1 during the cast-in step, depending on cases, melted to invade the iron species preform 1 to constitute MMC. As a result, a difference between the thermal expansion coefficient of the iron species preform 1 constituting MMC and the thermal expansion coefficient of the crankshaft 41 made of the iron species material is reduced and therefore, even when temperatures of the journal portions 33, 35 rise, the clearance between the crankshaft 41 and the bearing faces 34, 36 can be confined to an allowable range and vibration or noise in rotating the crankshaft 41 can be prevented from being brought about.

Further, by preventing the clearance at the interface of the inner peripheral face 11 of the iron species preform 1 and the outer peripheral face 12 from being brought about and ensuring the strength of the interface of the inner peripheral face 11 and the outer peripheral face 12, the thermal conduction efficiency between the base material and the iron species preform 1 is improved, and the thermal conductivity becomes uniform in the peripheral direction of the journal portions 33, 35, the sides of the bearing faces 34, 36 of the journal portions 33, 35 are uniformly expanded and support of the bearing metals 40a, 40b by the journal portions 33, 35 becomes stable, an increase in the friction coefficient between the crankshaft 41 and the bearing metals 40a, 40b is restrained. In accordance with the reduction in the friction resistance, fuel cost, function, durability or the like of the engine can be ensured.

Further, the clearance is eliminated at the interface of the thin-walled portions 38, 39 and the iron species preform 1 at the journal portions 33, 35, deformation by the load in machining the thin-walled portion, 38, 39 formed in thin-walls in machining the bearing faces 34, 36 of the journal portions 33, 35 is restrained and the accuracy of machining the journal portions 33, 35 is promoted.

Here, when the shrinking stresses $\sigma 3$, $\sigma 4$, $\sigma 5$, $\sigma 6$ in the first to fourth through holes 21A to 21D are excessively small, a constraining force opposed to the stress $\sigma 1$ of the thin-walled portions 38, 39 in accordance with solidifying and shrinking the melted aluminum species alloy becomes excessively small, a continuous clearance is formed at the interface of the inner peripheral face 11 and the base material and the interface strength becomes unstable. Hence, according to the embodiment, the through hole main bodies 22A to 22D of the first to fourth through holes 21A to 21D bored to the iron species preform 1 are formed in the cylindrical shape at inner faces thereof continuous by a section in the circular shape having the inner diameter of 1 to 19 mm, when the through holes 21A to 21D are assumedly formed by taper holes, although the taper holes are advantageous for close contact of the interface, it is difficult to machine the iron species preform, fabrication cost is increased, an undercut portion is formed at a portion at which the through hole and the inner peripheral face are continuous and the constraining force opposed to the shrinking stress $\sigma 1$ becomes excessively large, stress concentration is generated in solidification and shrinkage, particularly, a probability of breaking or cracking the thin-walled portions 38, 39 is increased.

Further, when the inner diameter "A" of the through holes 21A to 21D is made to be smaller than 1 mm, the constraining force opposed to the stress $\sigma 1$ of the thin-walled portions 38, 39 in accordance with solidification and shrinkage of the melted aluminum species alloy becomes excessively small, and an effect of promoting adherence of the interface is extremely small. Further, when subjected to a shot blasting processing, it is difficult to excellently blow shots to the inner face of the through hole and an effect of the shot blasting processing cannot be expected.

On the other hand, when the inner diameter of the through holes 21A to 21D is made to be larger than 19 mm, the volume of the iron species preform is reduced and there is a concern of reducing function and effect inherent to the preform, further, an influence of shrinkage in accordance with solidification of the melted aluminum species alloy in the first to fourth through holes 21A to 21D becomes considerable, adherence with the base material in the first to fourth through hole 21A to 21D is reduced, the constraining force opposed to the stress σ1 of the thin-walled portions 38, 39 becomes excessively small and the strength of the interface of the inner peripheral face 11 and the base material becomes unstable.

When the clearance "B" between the adjacent through holes 21, that is, the clearance "B" between centers of openings of the inner end 22Aa of the through hole main body 22A of the first through hole 21A and the inner end 22Ba of the through hole main body 22B of the second through hole 21B on the side of the inner peripheral face 11, the clearance "B" between centers of openings of the inner end 22Ba of the through hole main body 22B of the second through hole 21b and the inner end 22Ca of the through hole main body 22C of the third through hole 21C, the clearance "B" between center of openings of the inner end 22Aa of the through hole main body 22A of the first through hole 21A and the inner end 22Da of the through hole main body 22D of the fourth through hole 21D, are smaller than 1.5 times as much as the inner diameter "A", it is difficult to form the iron species preform 1 under pressure by a die, a significant increase in fabrication cost is increased in order to addingly machine the respective first to fourth through holes 21A through 21D by machining or the like, the volume of the iron species preform 1 is reduced and there is a concern of reducing function and effect inherent to the preform. On the other hand, when the clearance "B" between the adjacent through holes 21 exceeds 5 times as much as the inner diameter "A", a possibility of producing a clearance at a portion between the through holes is increased.

Further, when the radius of curvature of the curved face or the chamfering of the portions at which the inner peripheral face 11 and the inner ends 22Aa to 22Da of the respective through hole main bodies 22A to 22D opened to the inner peripheral face 11 of the first to fourth through holes 21A to 21D are continuous is excessively large, the interface strength and the close contact are deteriorated, on the other hand, when excessively small, it is difficult to fabricate the iron species preform 1, stress concentration is generated in solidifying and shrinking the melted aluminum species alloy, particularly, the thin-walled portions 38, 39 are broken or cracked.

Further, when the depths "C" of the first to fourth through holes 21A to 21D are smaller than 0.5 times as much as the inner diameter "A", whereas it is difficult for the melted aluminum species alloy to invade the first through the fourth through holes 21A through 21D in the cast-in operation, when exceeding 5 times as much as the inner diameter A, it is difficult to form the iron species preform 1 under pressure by a die to constitute a factor of considerably increasing fabrication cost in order to addingly machine the first through the fourth through holes 21A through 21D by machining or the like.

Figure 6A:
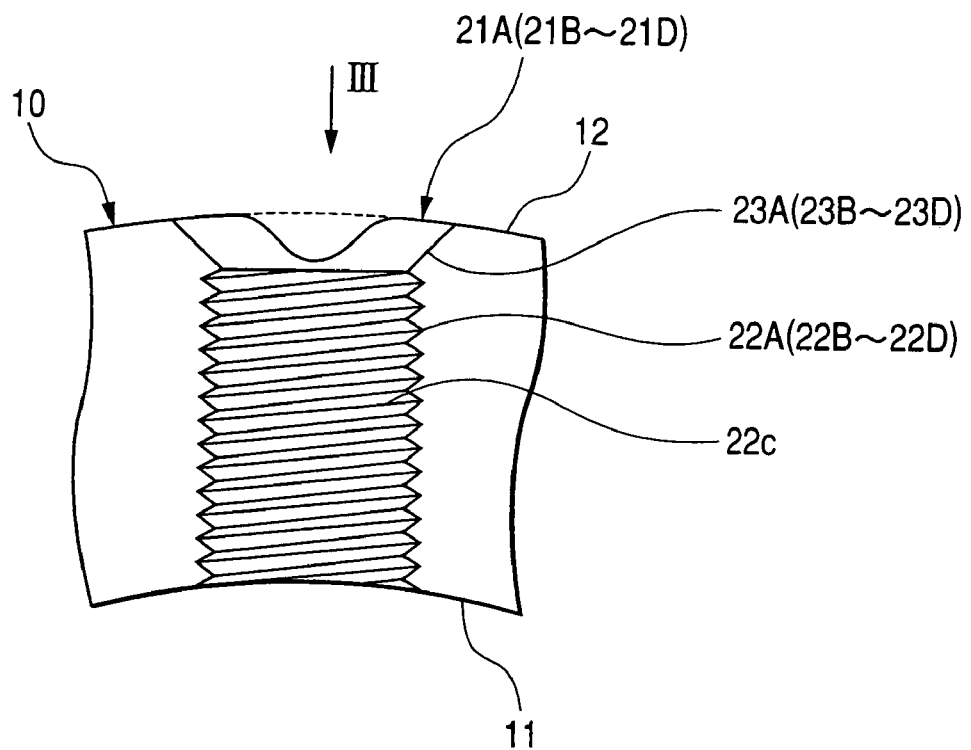
FIG. 6(a) is a sectional view showing other through hole
Figure 6B:
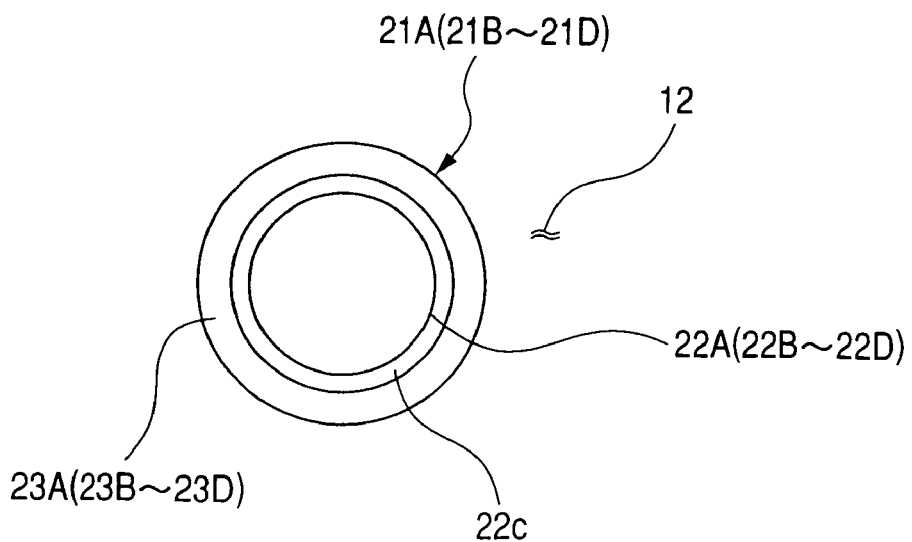
FIG. 6(b) is a view of the through hole of FIG. 6(a) viewing from III arrow mark direction of FIG. 6(a).
Figure 7A:
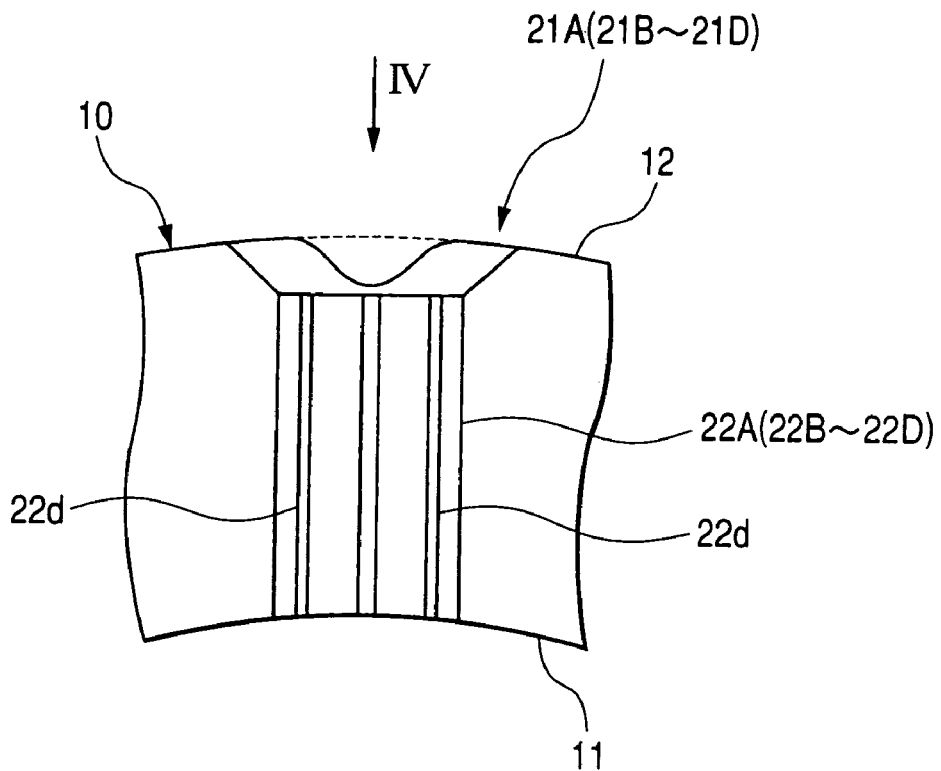
FIG. 7(a) is a sectional view showing other through hole.
Figure 7B:
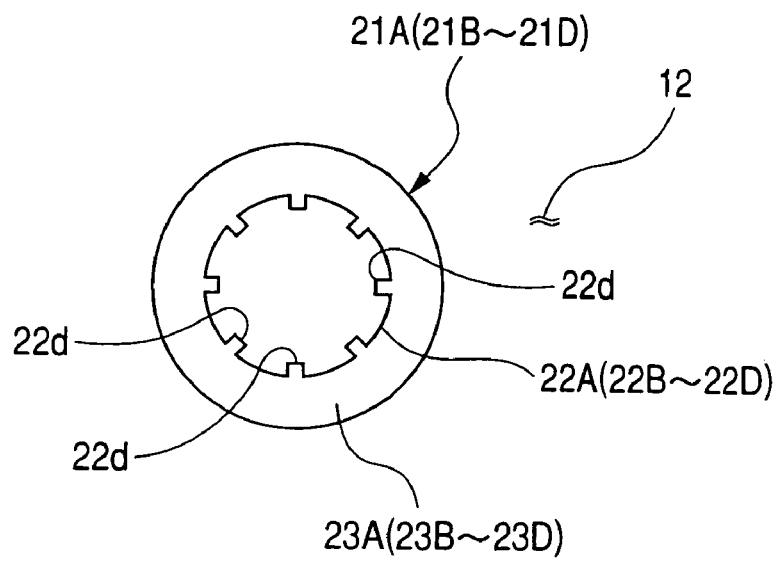
FIG. 7(b) is a view of the through hole of FIG. 7(a) viewing from IV arrow mark direction of FIG. 7(a).

Further, although according to the embodiment, the inner faces of the through hole main bodies 22A to 22D of the first to fourth through holes 21A to 21D of the iron species preform 1 are formed by the cylindrical shape continuous by the section in the circular shape, by subjecting the inner faces of the through holes to a surface area enlarging treatment by forming grooves 22c in a spiral shape at the inner faces of the through hole main bodies 22A to 22D as shown by FIG. 6(a) showing a section thereof and as shown by FIG. 6(b) showing a view viewing FIG. 6(a) from III arrow mark direction, forming a plurality of ribs 22d at the inner faces of the through main bodies 22A to 22D as shown by FIG. 7(a) showing a section thereof and as shown by FIG. 6(b) showing a view viewing FIG. 7(a) from IV arrow mark direction, or forming splits or the like, the resisting force by the shrinking stresses σ3, σ4, σ5, σ6 by solidifying and shrinking the melted aluminum species alloy invading the respective through holes 21A to 21D by increasing areas of the inner faces of the through hole main bodies 22A to 22D can be increased. Thereby, the shrinking stress σ1 operated along the inner peripheral face 11 and the shrinking stress σ2 operated along the outer peripheral face 12 are further firmly received, movement of the melted aluminum species alloy along the inner peripheral face 11 and the outer peripheral face 12 is restrained and the effect of bringing the inner peripheral face and the outer peripheral face 12 into contact with the base material is promoted and the residual stress produced at the base material after shrinking can be reduced.

Figure 8:
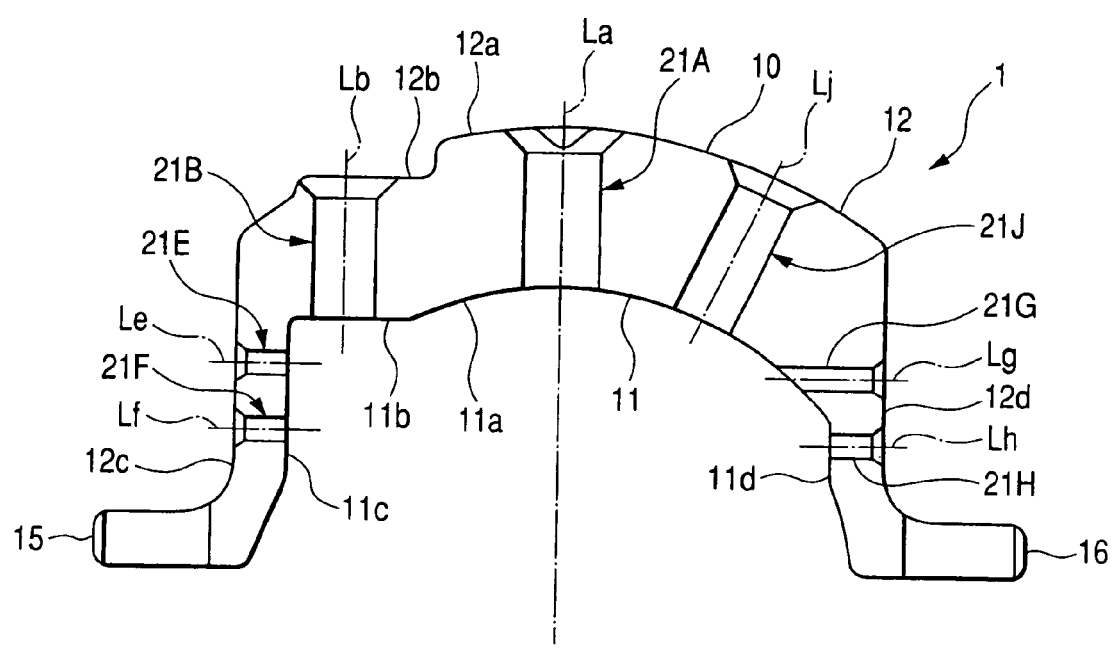
FIG. 8 is a sectional view of other iron species preform.

Further, as shown by a section of the iron species preform 1 in correspondence with FIG. 2, in FIG. 8, a number, arrangement, a size or the like of through holes for communicating the inner peripheral face 11 and the outer peripheral face 12 can optimally be set by a specification of a product shape or the like constituting MMC by forming the first through hole 21A having the reference line La orthogonal to the center core axis La and communicating the first inner peripheral face 11a and the outer peripheral face 12a, the second through hole 2B having the reference line Lb in parallel with the reference line La and communicating the second inner peripheral face 11b and the second outer peripheral face 12b, a pair of fifth through hole 21E, sixth through hole 21F having comparatively small diameters having reference lines Le, Lf orthogonal to the reference line La and communicating the third inner peripheral face 11c and the third outer peripheral face 12c, a seventh through hole 21G having a comparatively small diameter and having a reference line Lg orthogonal to the reference line La and communicating the first inner peripheral face 11a at a vicinity of the fourth inner peripheral face 11d and the fourth outer peripheral face 12d, an eighth through hole 21H having a comparatively small diameter and having a reference line Lh in parallel with the reference line Lg and communicating the fourth inner peripheral face 11d and the fourth outer peripheral face 12d, and a ninth through hole 21J having a reference line Lj skewedly intersecting with the center axis L between the first through hole 21A and the eighth through hole 21H and communicating the first inner peripheral face 11a and the first outer peripheral face 12a. It is preferable to determine the number, the arrangement, the sizes or the like of the through holes by a close contact state of the interface of a product and a situation of bringing about crack or the like on the side of the base material previously by an experiment or a simulation.

Second Exemplary Embodiment

Figure 9:
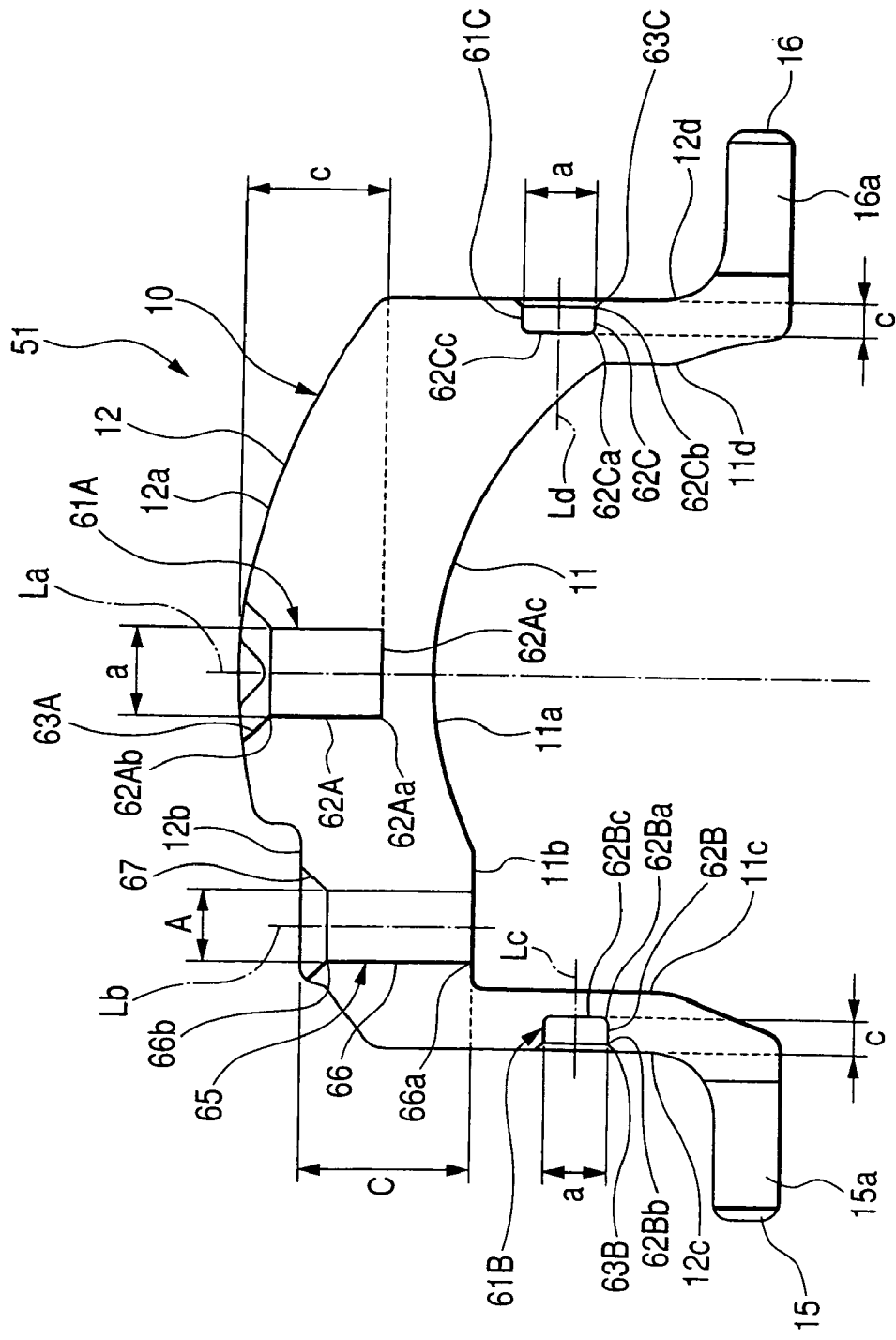
FIG. 9 is a sectional view of an iron species preform according to a second exemplary embodiment.

FIG. 9 shows an outline of an iron species preform 51 according to a second exemplary embodiment and is a sectional view in correspondence with FIG. 2. Further, by attaching portions in correspondence with FIG. 2 by the same notations, a detailed explanation of the portions will be omitted.

The iron species preform 51 according to the second exemplary embodiment is formed by an iron species powder sintered member similar to the iron species preform 1.

As shown by FIG. 9, similar to the iron species preform 1, the iron species preform 51 includes the preform main body 10 having the inner peripheral face 11 the section of which is constituted by the semicircular arc shape or the U-shape having the first inner peripheral face 11a, the second inner peripheral face 11b, the third inner peripheral face 11c, the fourth inner peripheral face 11d and the outer peripheral face 12 the section of which is constituted by the semicircular arc shape or the U-shape having the first outer peripheral face 12a, the second outer peripheral face 12b, the third outer peripheral face 12c, the fourth outer peripheral face 12d and is integrally formed with the flange portions 15, 16 at the two ends of the preform main body 10.

There are bored a plurality of through holes for communicating the outer peripheral face 12 and the inner peripheral face 11 of the preform main body 10 and the bottomed holes opened to the outer peripheral face 12. A restriction of boring the bottomed holes is smaller than that of the through holes and the bottomed holes can be bored even at portions restricting boring of the through holes. According to the second exemplary embodiment, there are bored a first bottomed hole 61A having a reference line La orthogonal to the center axis L and opened to the first outer peripheral face 12, a through hole 65 having a reference line Lb in parallel with the reference line La and communicating the second inner peripheral face 11b and the second outer peripheral face 12b, a second bottomed hole 61B having a reference line Lc orthogonal to the reference line La and opened to the third outer peripheral face 12c, and a third bottomed hole 61C having a reference line Ld orthogonal to the reference line La and opened to the fourth outer peripheral face 12d.

By forming the through hole 65, the inner peripheral face 11 and the outer peripheral face 12 of the iron species preform 51 are communicated by way of the through hole 65 and passage of molten metal is improved when the iron species preform 51 is inserted in the aluminum species alloy so as to be cast-in, by forming the first through the third bottomed holes 61A through 61C, an surface area of the iron species preform 51 is increased to improve adherence with the melted aluminum species alloy and the bonding strength, depending on cases, the melted aluminum species alloy is melted to invade the iron species preform 51 to constitute MMC. The first to third bottomed holes 61A to 61C and the through hole 65 are formed in forming under pressure by a die or in machining the sintered member. Preferably, efficient formation of fabrication is achieved and fabrication cost is restrained by simultaneously forming the holes in forming under pressure by the die.

The through hole 65 includes a through hole main body 66 a section of which is circular, which includes an inner face in a cylindrical shape continuous in a direction of the reference line Lb and an inner end 66a of which is opened to the second inner peripheral face 11b, and a taper hole portion 67 which is formed continuously to an outer end 66b of the through hole main body 66 and opened to the second outer peripheral face 12b, and an inner diameter of which is gradually increased as proceeding from a side of the outer end 66b of the through hole main body 66 to a side of the second outer peripheral face 12b. Similar to the respective through holes 21A to 21G of the first exemplary embodiment, it is preferable that the inner diameter "A" of the through hole main body 66 is 1 to 19 mm (1 mm≦A≦19 mm), and it is preferable to constitute a portion at which the inner end 66a of the through hole main body 66 opened to the inner peripheral face 11 and the inner peripheral face 11 are continuous by a smoothly continuous curved face, so-to-speak R shape or a chamfering and make the depth "C" of the through hole 65 equal or larger than 0.5 times as much as the inner diameter "A" of the through hole main body 66 and equal to or smaller than 5 times as much as the inner diameter "A" (0.5 A≦C≦5 A).

The first bottomed hole 61A includes a bottomed hole main body 62A a section of which is circular, which includes an inner face in a cylindrical shape continuous in a direction of the reference line La and an inner end 62Aa of which includes a bottom portion 62Ac, and a taper hole portion 63A which is formed continuously to an outer end 62Ab of the bottomed hole main body 62A and opened to the first outer peripheral face 12a and an inner diameter of which is gradually increased as proceeding from a side of the outer end 62Ab of the bottomed hole main body 62A to a side of the first outer peripheral face 12a.

The second bottomed hole 61B includes a bottomed hole main body 62B a section of which is circular, which includes an inner face in a cylindrical shape continuous in a direction of the reference line Lc and an inner end 62Ba of which includes a bottom portion 62Bc, and a taper hole portion 63B which is formed continuously to an outer end 62Bb of the bottomed hole main body 62B and an inner diameter of which is gradually increased as proceeding from a side of the outer end 62B of the bottomed hole main body 62B to a side of the third outer peripheral face 12c.

The third bottomed hole 61C includes a bottomed hole main body 62C a section of which is circular, which includes an inner face in a cylindrical shape continuous in a direction of the reference line Ld and an inner end portion 62Ca of which includes a bottom portion 62Cc and a taper hole portion 63C which is formed continuously to an outer end 62Cb of the bottomed hole main body 62C and is opened to the fourth outer peripheral face 12d and an inner diameter of which is gradually increased as proceeding from a side of the outer end 62Cb of the bottomed hole main body 62C to a side of the fourth outer peripheral face 12d.

Although shapes of the first through the third bottomed holes 61A through 61C and the through hole 65 differ by a specification of a product shape or the like constituting MMC, it is preferable that an inner diameter "a" of the bottomed hole main body 62A to 62C of the first to third bottomed holes 61A to 61C is 1 to 19 mm (1 mm≦a≦19 mm). Further, it is preferable that a depth "c" of the first to third bottomed holes 61A through 61C is equal to or larger than 0.5 times of the inner diameter "a" of the bottomed hole main bodies 62A to 62C and equal to or smaller than 5 times of the inner diameter "a" (0.5a≦c≦5a).

It is preferable to determine the inner diameter "a" of the bottomed hole main bodies 62A to 62C of the respective bottomed holes 61A to 61C and the depth "c" of the bottomed holes 61A to 61C or the like by a close contact state of an interface of a product and a situation of bringing about a crack or the like on a side of the base material in order to optimally set by a specification of a product shape or the like constituting MMC.

The iron species preform 51 is subjected to a shot blasting processing as necessary. By subjecting to the shot blasting processing, an oxide film or the like formed at the surface is removed to clean the surface, a free Cu phase dispersed in the matrix is exposed and an internal chill performance by the aluminum species alloy is promoted.

Figure 10:
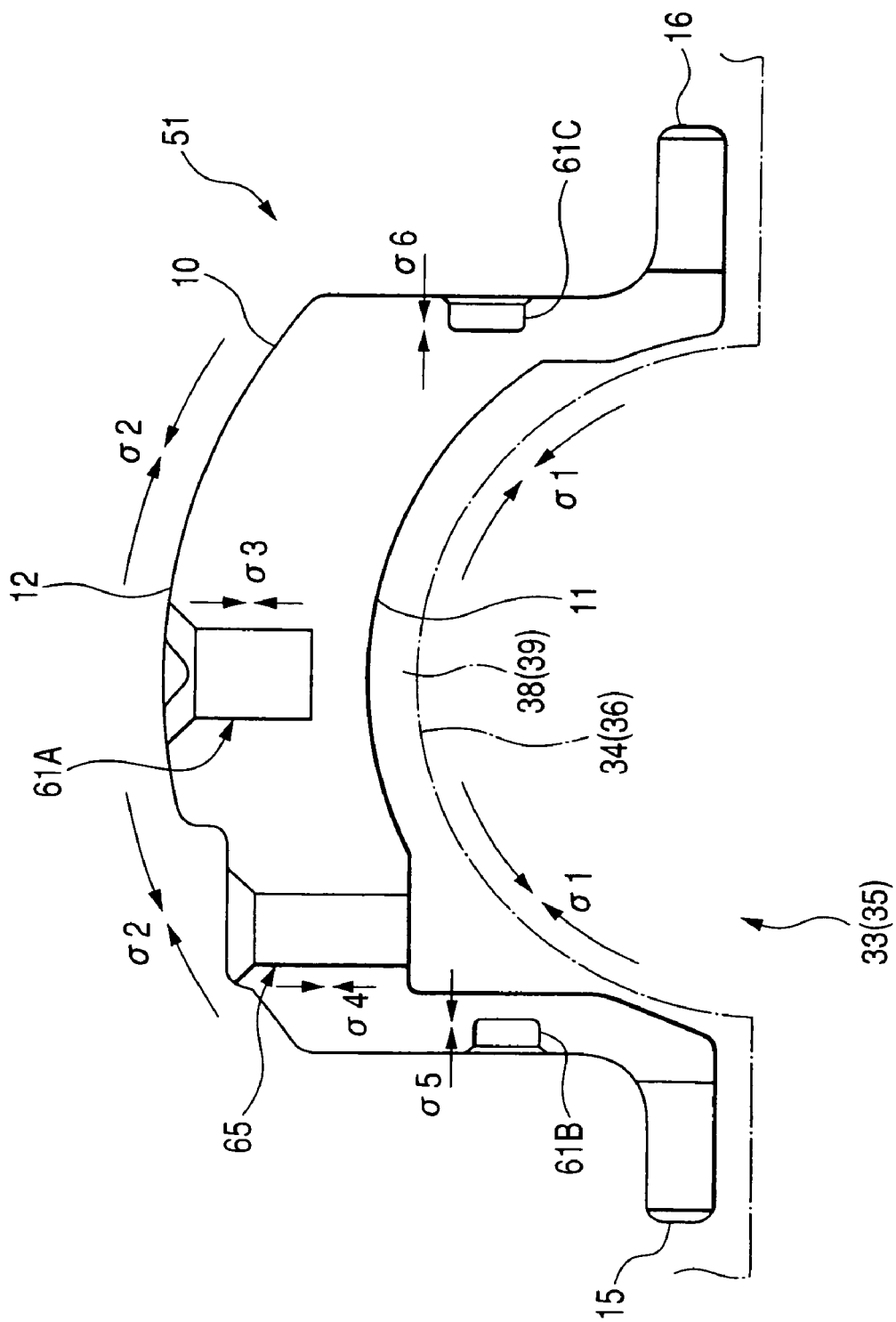
FIG. 10 is an explanatory view of a journal portion.

FIG. 10 shows an embodiment of a journal portion using the iron species preform 51, in forming the respective cylinder blocks by casting, the iron species preform 51 is provided by constituting MMC in the cast-in step by being arranged at a position of forming the journal portion of a casting die.

In the cast-in step, the melted aluminum species alloy injected to a side of the outer peripheral face 12 of the iron species preform 51 invades a side of the inner peripheral face 11 of the iron species preform along the surface of the iron species preform 51 and is supplied to the side of the inner peripheral face 11 by way of the through hole 65 to achieve excellent performance of passage of molten metal of the melted aluminum species alloy.

The shrinking stress σ1 is operated in the peripheral direction along the inner peripheral face 11 in solidifying and shrinking the melted aluminum species alloy injected to the thin-walled portions 38, 39 between the bearing faces 34, 36 of the journal portions 33, 35 and the inner peripheral face 11 of the iron species preform 51, and the shrinking stress σ2 is operated in the peripheral direction along the outer peripheral face 12 also by solidifying and shrinking the melted aluminum species alloy injected to the side of the outer peripheral face 12. On the other hand, the shrinking stresses σ3, σ4, σ5, σ6 are operated along the first bottomed hole 61A, the through hole 65, the second bottomed hole 61B and the third bottomed hole 61C by solidifying and shrinking the melted aluminum species alloy invading the first bottomed hole 61A, the through hole 65, the second bottomed hole 61B and the third bottomed hole 61C of the iron species preform 51.

By a resisting force by the shrinking stress σ4 by solidifying and shrinking the melted aluminum species alloy invading the through hole 65 of the iron species preform 51, the shrinking stress σ1 operated in the peripheral direction along the inner peripheral face 11 in solidifying and shrinking the melted aluminum species alloy injected to the thin-walled portions 38, 39 is dispersed and received, movement of the melted aluminum species alloy along the inner peripheral face 11 is restrained and the melted aluminum species alloy is brought into close contact with the inner peripheral face 11, a residual stress produced at the thin-walled portions 38, 39 after shrinking can be alleviated and uniformly dispersed and the residual stress of the thin-walled portions 38, 39 is alleviated and is prevented from being cracked or the like.

Similarly, by a resisting force by the shrinking stresses σ3, σ4, σ5, σ6 by solidifying and shrinking the melted aluminum species alloy invading the first bottomed hole 61A, the through hole 65, the second bottomed hole 61B and the third bottomed hole 61C of the iron species preform 51, the shrinking stress σ2 operated along the outer peripheral face 12 by solidifying and shrinking the melted aluminum species alloy injected to the side of the outer peripheral face 12 of the iron species preform 51 is dispersed and received, movement of the melted aluminum species alloy along the outer peripheral face 12 is restrained and the melted aluminum species alloy is brought into close contact with the outer peripheral face 12, a residual stress produced at the portion after shrinking can be alleviated and uniformly dispersed.

Further, in accordance with restraining the melted aluminum species alloy in the peripheral direction along the inner peripheral face 11 and the outer peripheral face 12 of the iron species preform 51 in solidifying and shrinking the melted aluminum alloy and bringing the melted aluminum alloy into close contact with the iron species preform 51, a clearance at an interface of the iron species preform 51 and the base material by the aluminum species alloy can be prevented from being brought about and the bonding strength of the interface of the inner peripheral face 11 and the outer peripheral face 12 of the iron species preform 51 and the base material including the thin-walled portions 38, 39 can be ensured.

Here, the iron species preform 51 is structured by the iron species powder sintered member and therefore, the iron species preform 51 includes pores, when the cast-in step is carried out, the melted aluminum species alloy is easily and stably brought into close contact with the iron species preform 51, depending on cases, MMC is constituted, a difference between the thermal expansion coefficient of the iron species preform 51 constituting MMC and the thermal expansion coefficient of the crankshaft 41 made of the iron species material is reduced. Therefore, even when the temperatures of the journal portions 33, 35 rise, the clearance between the crankshaft 41 and the bearing faces 34, 36 can be confined to an allowable range and vibration or noise in rotating the crankshaft 41 can be prevented from being brought about.

Further, by preventing the clearance at the interface of the inner peripheral face 11 and the outer peripheral face 12 of the iron species preform 51 from being brought about and ensuring the interface strength of the inner peripheral face 11 and the outer peripheral face 12, the thermal conduction efficiency between the base material comprising the aluminum species alloy and the iron species preform 51 is promoted and the thermal conductivity in the peripheral direction of the journal portions 33, 35 becomes uniform, the side of the bearing faces 34, 36 of the journal portions 33, 35 are uniformly expanded, support of the bearing metals by the journal portions 33, 35 becomes stable, an increase in the friction coefficient between the crankshaft and the bearing metal is restrained and fuel cost, function, durability or the like of the engine can be ensured in accordance with the reduction in the friction resistance.

Further, the clearance is eliminated at the interface of the thin-walled portions 38, 39 and the iron species preform 51 at the journal portions 33, 35, when the bearing faces 34, 36 of the journal portions 33, 35 are machined, deformation of the thin-walled portions 38, 39 formed in the thin-wall by the load in machining is restrained and accuracy of machining the journal portions 33, 35 is promoted.

Here, when the shrinking stress applied to the side of the inner peripheral face 11 of the throughhole 65 is excessively small, the constraining force opposed to the stress σ1 of the thin-walled portions 38, 39 in accordance with solidification and shrinkage of the melted aluminum species alloy becomes excessively small and the continuous clearance is formed at the interface of the inner peripheral face 11 and the base material to make the interface strength unstable. Hence, according to the exemplary embodiment, the through hole main body 66 of the through hole 65 bored to the iron species preform 51 is formed in the cylindrical shape at the innerface continuous by the section in the circular shape having an inner diameter of 1 through 19 mm, when the inner diameter "A" of the through hole 65 is assumedly made to be smaller than 1 mm, the constraining force opposed to the stress σ1 of the thin-walled portions 38, 39 in accordance with solidification and shrinkage of the melted aluminum species alloy becomes excessively small and the effect of promoting adherence of the interface becomes extremely small. On the other hand, when the inner diameter "A" of the through hole 65 is made to be larger than 19 mm, the volume of the iron species preform 51 is reduced and there is a concern of reducing a function and an effect inherent to the preform, the influence of shrinkage in accordance with solidification of the melted aluminum species alloy is increased in the through hole 65, the adherence with the base material is reduced in the through hole 65, the constraining force opposed to the stress σ1 of the thin-walled portions 38, 39 becomes excessively small and the strength of the interface of the inner peripheral face 11 and the base material becomes unstable.

Further, when the resisting force by the shrinking stresses σ3, σ5, σ6, σ4 by solidification and shrinkage of the melted aluminum species alloy invading the first through the third bottomed holes 61A through 61C and the through hole 65 is excessively small, the constraining force opposed to the stress σ2 of the base material on the side of the outer peripheral face 12 in accordance with solidification and shrinkage of the melted aluminum species alloy becomes excessively small, the clearance is formed continuously to the interface of the outer peripheral face 12 and the base material and the interface strength becomes unstable. Hence, according to the embodiment, the inner faces in which the inner diameter "A" of the through hole 65 bored to the iron species preform 51 and the inner diameter a of the first through the third bottomed holes 61A through 61C are continuously 1 through 19 mm by the section in the circular shape, when the inner diameter "A" of the through hole 65 and the inner diameter a of the respective bottomed holes 61A to 61C are made to be smaller than 1 mm, the constraining force opposed to the stress σ2 by the base material on the side of the outer peripheral face 12 in accordance with solidification and shrinkage of the melted aluminum species alloy becomes excessively small, an effect of promoting the adherence of the interface becomes extremely small, further, when subjected to the shot blasting processing, it is difficult to blow excellently shots to the inner face of the through hole main body 66 and the bottomed hole main bodies 62A to 62C and the effect of the shot blasting processing cannot be expected.

On the other hand, when the inner diameter "A" of the through hole 65 and the inner diameter a of the respective bottomed holes 61A to 61C is made to be larger than 19 mm, the volume of the iron species preform 51 is reduced and there is a concern of reducing a function and an effect inherent to the preform, further, the influence of shrinkage in accordance with solidification of the melted aluminum species alloy is significant in the through hole main body 66 and the bottomed hole main bodies 62A to 62C, the adherence with the base material in the through hole main body 66 and the bottomed hole main bodies 62A to 62C is reduced and the constraining force opposed to the stress σ2 of the outer peripheral face 12 and the base material becomes excessively small to make the strength of the interface of the outer peripheral face 12 and the base material unstable.

Further, when the depth "C" of the through hole 65 and the depth "c" of the first to third bottomed holes 61A to 61C are respectively smaller than 0.5 times as much as the inner diameter "A", the inner diameter "a", it is difficult for the melted aluminum species alloy to invade the through hole 65 and the first to third bottomed holes 61A to 61C in the internal chill, when exceeding 5 times as much as the inner diameter "A", the inner diameter "a", it is difficult to form the iron species preform 51 under pressure by a die to constitute a factor of bringing about a considerable increase in fabrication cost in order to addingly machine the through hole 65 and the first to third bottomed holes 61A to 61C by machining or the like.

Figure 11A:
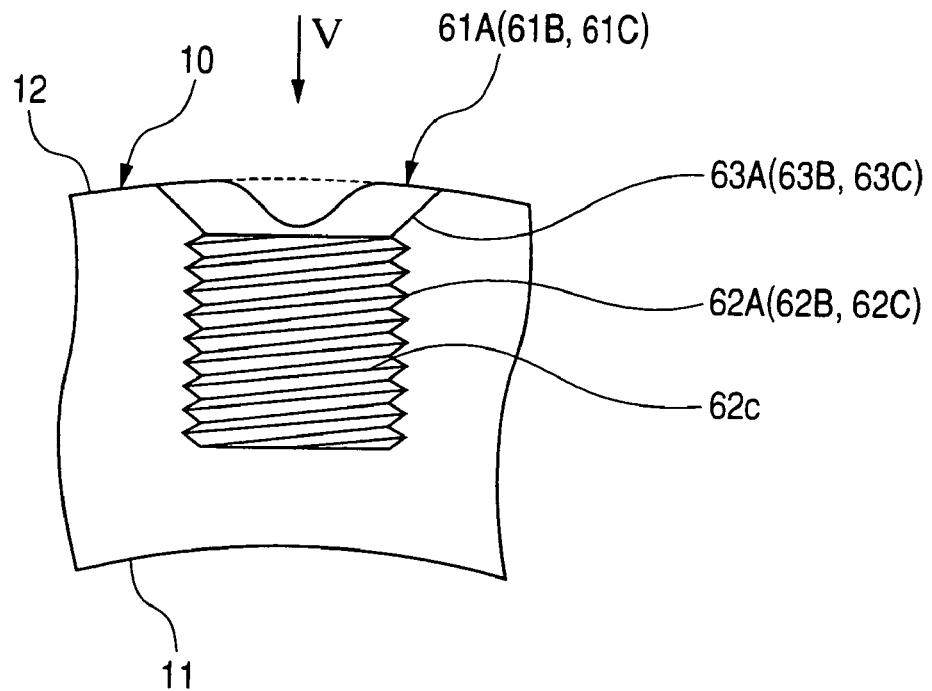
FIG. 11(a) is a sectional view of other bottomed hole.
Figure 11B:
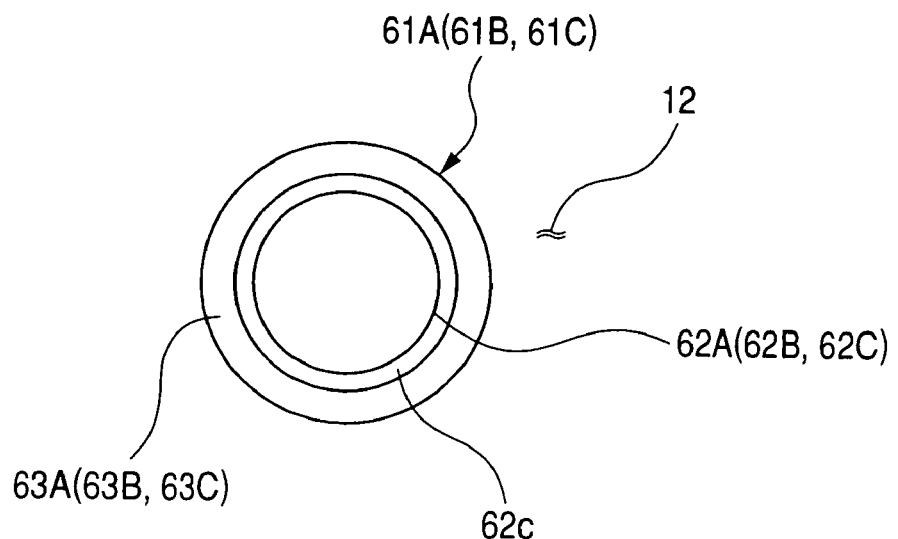
FIG. 11(b) a view of the bottomed hole of FIG. 11(a) viewing from V arrow mark direction of FIG. 11(a).
Figure 12A:
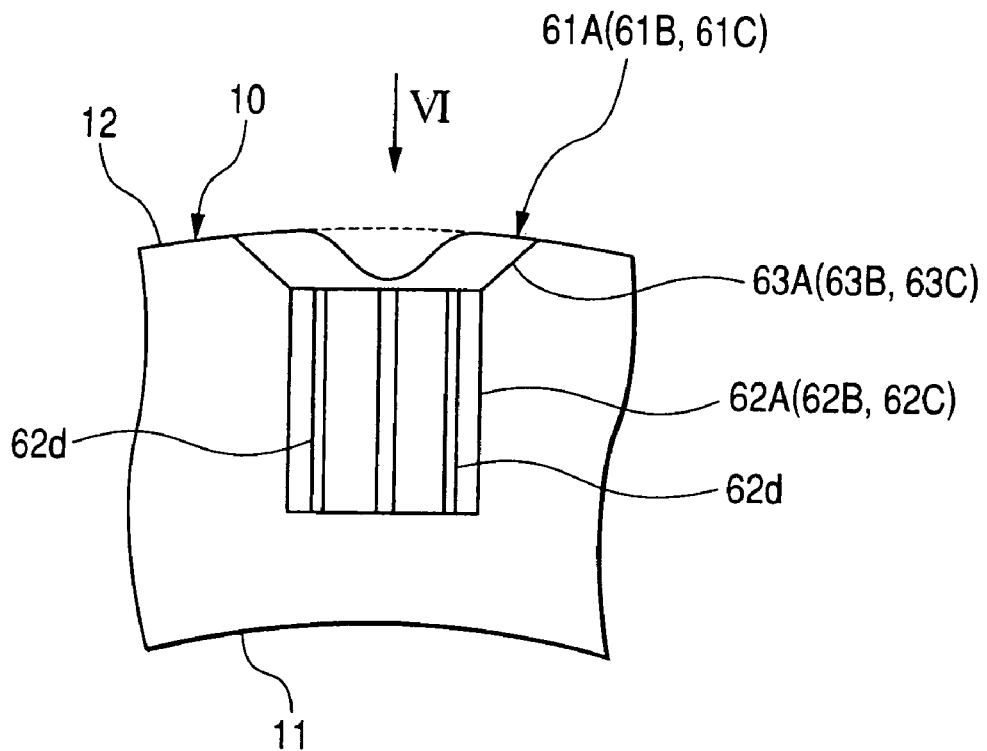
FIG. 12(a) is a sectional view of other bottomed hole.
Figure 12B:
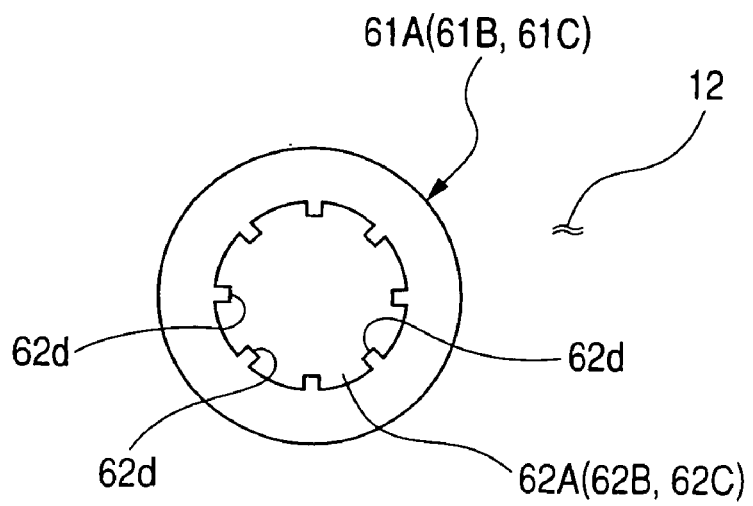
FIG. 12(b) a view of the bottomed hole of FIG. 12(a) viewing from V arrow mark direction of FIG. 12(a).

Further, although according to the exemplary embodiment, the inner faces of the bottomed hole main bodies 62A to 62C of the first to third bottomed holes 61A to 61C of the iron species preform 51 by the cylindrical shape continuous by the section in the circular shape, by increasing the area of the inner faces of the bottomed hole main bodies 62A to 62C by subjecting inner faces of the bottomed hole main bodies 62A to 62C to the surface area increasing treatment by forming grooves 62c in a spiral shape at the inner faces of the bottomed hole main bodies 62A to 62C as shown by FIG. 11(a) showing a section thereof and as shown by FIG. 11(b) showing a view viewing FIG. 11(a) in V arrow mark direction, forming pluralities of ribs 62d at the inner faces of the bottomed hole main bodies 62A to 62C as shown by FIG. 12(a) showing a section thereof and as shown by FIG. 12(b) showing a view viewing FIG. 12(a) from VI arrow mark direction, shrinking stresses σ3, σ5, σ6 by solidification and shrinkage of the melted aluminum species alloy invading the first through the third bottomed holes 61A through 61C can be increased. Thereby, the shrinking stress σ2 operated in the peripheral direction along the outer peripheral face 12 can further firmly be received, the effect of bringing the outer peripheral face 12 into close contact with the base material is promoted by restraining movement of the melted aluminum species alloy formed at the outer peripheral face 12 and the residual stress produced at the base material after shrinking can be alleviated.

Further, although according to the exemplary embodiment, the first bottomed holes 61A to 61C opened to the outer peripheral face 12 are bored, a bottomed hole opened to the inner peripheral face 11 can also be arranged. Further, numbers and arrangement and sizes or the like of the through holes and the bottomed holes can optimally be set by a specification of a product shape or the like constituting MMC. It is preferable to determine the number, the arrangement, the size or the like of the through holes by a state of close contact of the interface of a product and a situation of bringing about a crack or the like on the side of the base material previously by an experiment or a simulation.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. A journal for supporting a shaft comprising:
   a bearing face having a semicircular arc shape portion for supporting the shaft; and a preform cast in the journal main including:
   a preform main body having a cross section in a semicircular arc shape or a U-shape;
   an inner peripheral face continuously extending along the axial direction of the shaft; an outer peripheral face continuously extending along the axial direction of the shaft;
   a hole penetrating the preform main body from the outer peripheral face to the inner peripheral face and pointing to the semicircular arc shape portion of the bearing face.

2. The journal according to claim 1, further comprising a thin-wall portion provided on the inner peripheral face of the preform, the thin-wall portion is formed by casting-in with an aluminum species alloy,
   wherein the bearing face is provided on the thin-wall portion at another side of the preform.

3. The journal according to claim 2, wherein the iron species preform comprises an iron species powder sintered member.

4. The journal according to claim 2, wherein the hole includes a groove or a rib at the inner face of the hole.

5. The journal according to claim 1, wherein the preform is an iron species preform and is cast-in with an aluminum species alloy base material.

6. The journal according to claim 1, when an inner diameter of the hole is A, then $$1 \text{ mm} \leq A \leq 19 \text{ mm}.$$

7. The journal according to claim 1, when the inner diameter of the hole is A, and a depth of the hole is C, then $0.5 A \leq C \leq 5 A.$ 8. The journal according to claim 1, wherein a portion, in which an inner end of the through hole opened to the inner peripheral face and the inner peripheral face are continuous, is constituted by a smoothly continuous curved face or a chamfering.

9. The journal according to claim 1, wherein an inner face of the hole is subjected to a surface area increasing treatment.

10. The journal according to claim 1, wherein a plurality of holes are bored in the preform main body, and when the inner diameter of the hole is A, and a clearance between centers of openings of adjacent holes at the inner peripheral face is B, then $1.5 A \leq B \leq 5 A.$ 11. The journal according to claim 1, wherein the preform main body further includes a bottomed hole opened to the inner peripheral face or the outer peripheral face.

12. The journal according to claim 11, when an inner diameter of the bottomed hole is "a", then $1 \text{ mm} \leq a \leq 19 \text{ mm}.$ 13. The journal according to claim 11, when an inner diameter of the bottomed hole is "a", and a depth of the bottomed hole is "c", then $0.5a \leq c \leq 5a.$ 14. The journal according to claim 11, wherein the bottomed hole includes a groove or a rib at the inner face of the bottomed hole.

* * * * *